US011343330B2

(12) United States Patent
Luskin et al.

(10) Patent No.: US 11,343,330 B2
(45) Date of Patent: May 24, 2022

(54) SECURE ACCESS TO INDIVIDUAL INFORMATION

(71) Applicant: VYRTY Corporation, Piedmont, SC (US)

(72) Inventors: Eugene Luskin, Issaquah, WA (US); Uladzimir Abashyn, Bellevue, WA (US)

(73) Assignee: VYRTY Corporation, Piedmont, SC (US)

( * ) Notice: Subject to any disclaimer, the term of this patent is extended or adjusted under 35 U.S.C. 154(b) by 435 days.

(21) Appl. No.: 16/388,822

(22) Filed: Apr. 18, 2019

(65) Prior Publication Data
US 2019/0327311 A1 Oct. 24, 2019

Related U.S. Application Data

(60) Provisional application No. 62/659,587, filed on Apr. 18, 2018.

(51) Int. Cl.
*H04L 67/146* (2022.01)
*H04L 9/06* (2006.01)
*H04L 67/02* (2022.01)
*H04L 9/32* (2006.01)
*G06K 19/06* (2006.01)
*H04L 9/14* (2006.01)

(52) U.S. Cl.
CPC ...... *H04L 67/146* (2013.01); *G06K 19/06037* (2013.01); *H04L 9/0643* (2013.01); *H04L 9/14* (2013.01); *H04L 9/3263* (2013.01); *H04L 67/02* (2013.01)

(58) Field of Classification Search
CPC ..... H04L 67/146; H04L 9/0643; H04L 67/02; H04L 9/3263; H04L 9/14; H04L 2209/88; H04L 9/0891; H04L 2209/38; H04L 9/3239; H04L 9/0897; G06K 19/06037
See application file for complete search history.

(56) References Cited

U.S. PATENT DOCUMENTS

| 6,336,900 | B1 | 1/2002 | Alleckson et al. |
| 6,944,767 | B1 | 9/2005 | Judson |
| 7,424,437 | B2 | 9/2008 | Maus et al. |
| 8,256,664 | B1* | 9/2012 | Balfanz ................ H04W 12/06 235/375 |
| 9,613,226 | B2 | 4/2017 | Khassanov et al. |

(Continued)

FOREIGN PATENT DOCUMENTS

CN    103729529 A    4/2014

OTHER PUBLICATIONS

Notice of Allowance for U.S. Appl. No. 16/432,130, dated Nov. 18, 2020, 8 pages.

(Continued)

*Primary Examiner* — Mohammad W Reza
(74) *Attorney, Agent, or Firm* — Seed IP Law Group LLP

(57) ABSTRACT

A facility for accessing information relating to a person is described. In a reader device, the facility accesses first credentials stored in a first storage device, second credentials stored in a second storage device, and third credentials stored in the reader device. In the reader device, the facility uses a combination of the first credentials, second credentials, and third credentials to decrypt information relating to the person stored in the first storage device.

22 Claims, 33 Drawing Sheets

(56) References Cited

U.S. PATENT DOCUMENTS

| | | |
|---|---|---|
| 9,615,255 B2 | 4/2017 | Milchtaich |
| 9,619,616 B2 | 4/2017 | Raduchel |
| 9,679,251 B2 | 6/2017 | Santos et al. |
| 9,959,584 B1 | 5/2018 | Frank et al. |
| 2002/0085713 A1 | 7/2002 | Feig et al. |
| 2003/0040940 A1 | 2/2003 | Nehammer |
| 2003/0074564 A1 | 4/2003 | Peterson |
| 2004/0235514 A1 | 11/2004 | Bloch et al. |
| 2005/0055560 A1 | 3/2005 | Kendon |
| 2005/0086497 A1 | 4/2005 | Nakayama |
| 2005/0195975 A1 | 9/2005 | Kawakita |
| 2005/0237776 A1 | 10/2005 | Gropper et al. |
| 2006/0036845 A1 | 2/2006 | Shu |
| 2006/0085347 A1 | 4/2006 | Yiachos |
| 2006/0240806 A1 | 10/2006 | Demirbasa et al. |
| 2007/0006322 A1 | 1/2007 | Karimzadeh et al. |
| 2007/0053345 A1 | 3/2007 | Hsu et al. |
| 2008/0014869 A1 | 1/2008 | Demirbasa et al. |
| 2008/0071543 A1 | 3/2008 | Jarvis et al. |
| 2009/0112627 A1 | 4/2009 | Berkman et al. |
| 2009/0132823 A1 | 5/2009 | Grimen et al. |
| 2009/0204433 A1 | 8/2009 | Darian et al. |
| 2010/0030690 A1 | 2/2010 | Herlitz |
| 2010/0080383 A1* | 4/2010 | Vaughan ............... H04L 9/0827 380/44 |
| 2010/0122083 A1 | 5/2010 | Gim et al. |
| 2010/0169289 A1 | 7/2010 | Newport et al. |
| 2013/0200999 A1 | 8/2013 | Spodak et al. |
| 2014/0275876 A1 | 9/2014 | Hansen et al. |
| 2015/0324524 A1 | 11/2015 | Hosoda |
| 2015/0324525 A1 | 11/2015 | Saffian |
| 2015/0365237 A1 | 12/2015 | Soffer |
| 2016/0132925 A1* | 5/2016 | Durst, Jr. ........... G06Q 30/0257 705/14.53 |
| 2016/0232306 A1 | 8/2016 | Achan |
| 2017/0318484 A1 | 11/2017 | Lindheimer et al. |
| 2018/0129788 A1 | 5/2018 | Sitrick et al. |
| 2020/0082423 A1* | 3/2020 | Glazier ............... H04L 67/2804 |

OTHER PUBLICATIONS

Office Action for U.S. Appl. No. 16/432,130, dated Aug. 11, 2020, 11 pages.

Löhr et al., "Securing the e-health cloud", Proceedings of the 1st ACM International Health Informatics Symposium, ACM Digital Library, Nov. 11-12, 2010, pp. 220-229.

Hall et al., "Enabling remote access to personal electronic medical records", IEEE Engineering in Medicine and Biology Magazine, vol. 22(3), May-Jun. 2003, pp. 133-139.

International Search Report and Written Opinion for Application No. PCT/US2015/053612; Applicant: VYRTY Corporation; dated Jan. 21, 2016; 21 pages.

Notice of Allowance received from the U.S. Patent Office for U.S. Appl. No. 14/873,107, dated Jan. 4, 2017, Examiner Bradley W. Holder, 22 pages.

Office Action for Chinese Application No. 201580064815.9, dated Sep. 9, 2019, 38 pages. (With English Machine Translation).

Notice of Allowance for U.S. Appl. No. 16/148,815, dated Oct. 25, 2019, 8 pages.

\* cited by examiner

SECURE ACCESS TO INDIVIDUAL INFORMATION

CROSS-REFERENCE TO RELATED APPLICATION(S)

This application claims the benefit of U.S. Provisional Patent Application No. 62/659,587, filed Apr. 18, 2018, which is hereby incorporated by reference in its entirety.

Each of the following is hereby incorporated by reference in its entirety: U.S. Provisional Application No. 62/154,612 filed Apr. 29, 2015 and titled SECURE ACCESS TO INDIVIDUAL INFORMATION; U.S. Provisional Application No. 62/134,490 filed Mar. 17, 2015 and titled SECURE ACCESS TO INDIVIDUAL INFORMATION; U.S. Provisional Application No. 62/058,107, filed on Oct. 1, 2014, and titled METHOD AND APPARATUS FOR SECURED DATA STORAGE, OFFLINE DATA EXCHANGE AND GOVERNED PROTECTED DATA ACCESS; U.S. Provisional Application No. 62/066,866, filed on Oct. 21, 2014 and titled METHOD AND APPARATUS FOR ENCRYPTED OFFLINE DATA STORAGE, PROTECTED ONLINE BACKUP AND SECURED DATA PROCESSING; U.S. Provisional Application No. 62/110,613 filed Feb. 2, 2015 and titled METHOD AND APPARATUS FOR PROTECTED OFFLINE DATA STORAGE AND SECURE RECORDS COMPLETION AND UPDATES; U.S. patent application Ser. No. 14/873,107 filed Oct. 1, 2015, now U.S. Pat. No. 9,613,226, and titled SECURE ACCESS TO INDIVIDUAL INFORMATION; U.S. patent application Ser. No. 15/435,220 filed Feb. 16, 2017, and titled SECURE ACCESS TO INDIVIDUAL INFORMATION; U.S. patent application Ser. No. 15/795,100 filed February Oct. 26, 2017 now U.S. Pat. No. 9,817,998, and titled SECURE ACCESS TO INDIVIDUAL INFORMATION; U.S. Provisional Application No. 62/342,153 filed May 26, 2015 and titled SECURE ACCESS TO INDIVIDUAL INFORMATION; U.S. patent application Ser. No. 15/605,851 filed May 25, 2017 and titled SECURE ACCESS TO INDIVIDUAL INFORMATION; and U.S. Provisional Application No. 62/577,597 filed Oct. 26, 2017 and titled COLLECTION AND AGGREGATION OF SENSITIVE PATIENT DATA AND ENCRYPTION SCHEME FOR MAKING SECURE PATIENT DATA AVAILABLE TO AUTHORIZED PARTIES. In cases where material incorporated herein by reference conflicts with the present disclosure, the present disclosure controls.

BACKGROUND

Various kinds of services performed with respect to individuals rely on information about the individual. For example, medical services provided to a patient often rely on information about the patient including innate patient attributes such as date of birth, weight, and height; results of tests such as blood pressure, pulse, blood panels, and radiological studies; diagnostic and interventional histories; and health insurance information. In some contexts, the above is referred to as "patient health information." Financial services provided to a person often rely on information about the person such as social security number and other identifying information, credit score, employment history, and account numbers and balances. National border regulation services performed with respect to travelers often rely on information about the traveler such as identifying information, citizenship and residency status, international travel history, and photographs.

For many of these kinds of services, the advent of cloud-based storage has been accompanied by techniques for storing the corresponding individual information in the cloud, often in connection with some kind of security technique designed to reduce the risk of unauthorized access to the information. For example, cloud-based electronic medical record systems seek to store patient information on Internet-connected storage devices, such that medical service providers in a variety of locations can access the patient's electronic medical record via the Internet.

DETAILED DESCRIPTION

Figure 1:
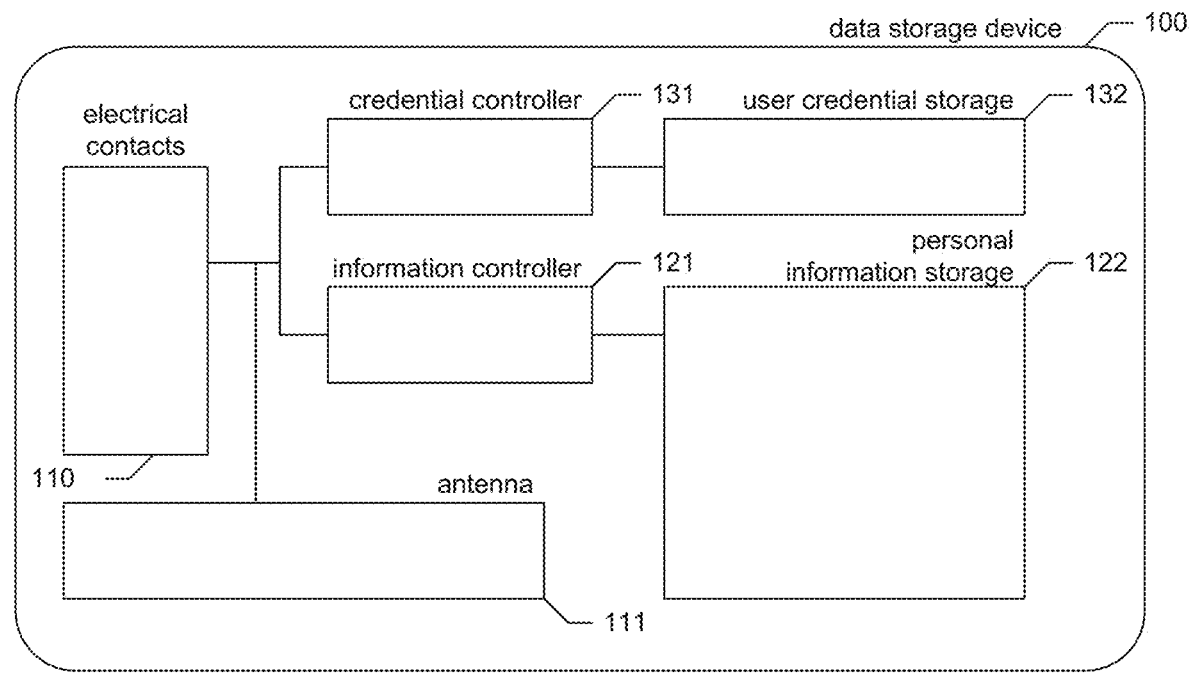
FIG. 1 is a device diagram showing components included in a data storage device used by the facility in some embodiments.

The inventors have recognized that the sorts of detailed individual information used in performing many kinds of services with respect to individuals can have significant value to data thieves, for eventual use in identity theft, blackmail, fraud, insider trading, marketing expensive niche products and services, etc. The inventors have further recognized that such unauthorized access to and exploitation of a person's individual information can be extremely expensive or otherwise disadvantageous to the person, and/or others.

The inventors have further recognized that there are a variety of kinds of information technology exploits and attacks available to information thieves that can be effective in gaining unauthorized access to data stored on any Internet-connected storage devices, even those that implement relatively sophisticated security techniques, despite ongoing efforts to protect such stored data.

Accordingly, the inventors have concluded that individual information stored in an Internet-accessible storage device to facilitate retrieval by a service provider is vulnerable to theft by information thieves, even when sophisticated, and even state-of-the-art security techniques are used.

For these reasons, the inventors have conceived and reduced to practice a software and/or hardware facility for providing secure, geographically-diverse access to individual information ("the facility"). In some embodiments, the facility enables exchange of a patient's electronic health information between healthcare providers (doctors, physicians, nurses, testing laboratories, imaging centers, and other certified individuals) via secure media that is in possession and under control of the patient.

In some embodiments, the facility uses a portable data storage device such as a smart card or other device sized similarly to a credit card to store each user's data. Where the facility is used to store health data, for example, in some embodiments the data storage device is incorporated into each user's medical insurance card or healthcare organization membership card. In particular, a data storage device stores the user's data in encrypted form, as well as credentials for the user. In some embodiments, the user credentials are, e.g., a security certificate and/or one or more cryptographic keys. In some embodiments, these credentials for the user are originated in a physically and communicatively isolated location ("a vault") into which no network connections pass, and are copied to the user's smart card inside this vault. In some embodiments, user's individual information and the user's credentials are stored separately and/or in a manner that isolates them from each other, such as in different physical or logical storage devices contained within the smart card.

Typically, each of a number of different service providers—such as physicians, medical testing or imaging centers, etc.—are outfitted with one or more data access devices, or "readers." When the user visits a service provider, to access the user's data, the user's data storage device is inserted into a reader, along with a smart card containing credentials for a service provider ("access key storage device"). For example, at a doctor's office, the user's smart card may be inserted into a reader along with a smart card containing credentials for the doctor treating the user. In various embodiments, the reader uses various protocols to interact with the smart cards inserted into them, such as USB. In some embodiments, the reader is connected to a computer system used in the service provider's practice, such as a desktop computer system or a laptop computer system.

Based on credentials on the user's smart card, service provider credentials on the service provider's smart card, and reader credentials stored in the reader, the decrypts the encrypted data on the user's smart card and provides access to it, such as via the provider computer system. For example, a doctor can access a user's social security number, test results, treatment history, etc. Further, while both smart cards are in the reader, these credentials can be used to store on the user's smart card new or changed information on the storage device in encrypted form, such as new diagnoses, treatment plans, etc. The provider computer system can be connected directly or indirectly to a variety of devices from which this new or changed information is obtained, including provider testing devices, provider storage devices, provider input devices, etc.

In some embodiments, the data access device obtains the service provider credentials in a way other than the service provider inserting a service provider smart card into the data access device. In various such embodiments, the service provider credentials are retrieved wirelessly from an object carried by or on the service provider or their proxy, such as by a smartphone or other communications device, a name tag or other identification badge, a device worn in the manner of a watch or glasses, a tag sewn into clothing, etc. In various embodiments, such wireless communication is via, for example, WiFi, Bluetooth, NFC, RFID, infrared, etc. In some embodiments, the user's credentials are provided in one or more of these alternative manners.

In some embodiments, the data access device accesses the user's encrypted data in a manner other than reading it from a smart card inserted into the data access device. In various such embodiments, the data access device reads and writes the user's encrypted data wirelessly, such as on a smartphone or other communications device carried by the user. In some embodiments, the data access device reads and writes the user's encrypted data on an Internet server.

In some embodiments, the credentials possessed by each reader that allow the reader to decrypt the contents of the user's smart card include a revolving reader certificate. This revolving reader certificate is a basis for disabling readers that are being used improperly. In the normal course of events, a new revolving reader certificate is periodically generated and distributed to all of the readers. Each reader retains all received revolving reader certificates for use in decrypting user smart card data encrypted by a reader using whatever certificate the encrypting reader had most recently received at the time of encryption, and uses the most recent revolving reader certificate to encrypt the user smart card data. However, where it is determined that a particular reader is being used improperly, the facility can deny that reader future revolving reader certificates, making it impossible for that reader to read user smart cards whose contents were encrypted using newer revolving reader certificates.

In some embodiments, the reader is configured to connect to a service provider's computer system as a standard removable storage device as a way for the service provider's computer system to store new data on the user's smart card in encrypted form. In some embodiments, the reader is further configured to connect to a service provider's computer system as a printer, so that even service provider computer systems that are not configured to store data on removable storage devices can store data on the user's smart card.

In some embodiments, at certain points when the user's smart card is in a reader, the encrypted data stored in the user's smart card is forwarded to a backup store via a strictly one-way connection—that is, because of physical limitations of how the backup store is connected to the Internet, data can only flow towards the backup store, never away from the backup store. Where a user loses his or her smart card, the facility creates a new card; within the vault, copies the user's credentials to the new card; and, at the site of the backup store, copies to the new card the user's encrypted data from the backup store. Until the user's encrypted data from the backup store is loaded onto the new card, its separation from the user's credentials stored on the card prevents its decryption.

In some embodiments, the facility enables a service provider to store data on the user's card that is not yet available to store when the user's card is removed from the service provider's reader. While the user's card is in the service provider's reader, rather than storing substantive data, the reader stores on the user's card a very large, randomly determined session identifier. When the service provider finishes generating the data to be stored on the user's card, the service provider's reader uploads to a "completion server" a copy of the data that has been encrypted with a public key associated with the user, along with the session identifier. The next time the user's smart card is inserted in any reader, it retrieves the session identifier from the user's smart card, and uses the session identifier to retrieve the encrypted data from the completion server and store this data on the user's smart card.

In some embodiments, the facility performs certain forms of collective analysis on the individual information stored on behalf of many or all of the users. E.g., in some embodiments, the readers aggregate user data across groups of users, and contribute these aggregates to an aggregated data store. For example, an insurance company may aggregate information about its patients as a basis for discerning health and/or treatment trends among the patients.

Patient data is accessed when patients insert their individual patient data storage devices into a specialized reader device at a service provider facility, such as a doctor's office. Each reader aggregates certain data across the data storage devices inserted into it, such as by counting the number of diabetes diagnoses among the patients whose cards are inserted. Each reader forwards its aggregation results to one or more specialized aggregation collection devices in an encrypted form that the collection device can decrypt, such as a form encrypted with a public key of the aggregation device. In some cases, each reader forwards its aggregation results to each of a group of collection devices. In some cases, the collection devices' hardware design is tailored to securely receiving, storing, and forwarding these aggregation results, as is all of the software that executes on it. In some cases, the collection devices communicate securely to determine a consensus about the overall aggregation results received from all of the readers. One or more of the collection devices than report the consensus overall aggregation results to a server, such as an analytics server. In some cases, a minimum quorum percentage of the collection devices must report the consensus overall aggregation results to the server, such as a majority of the collection devices. In some cases, multiple layers of collection devices are employed to perform this collection process. In some such cases, the consensus and quorum aspects of the processor performed only in the highest layer of collection devices—that is, the layer closest to the server, and the furthest from the readers.

In some cases, each patient is identified for purposes of tracking the patient's medical information by a hash of a combination of common identifying information for the user, such as name, birthdate, taxpayer identification number, etc. A public/private key pair is also typically issued to each patient, the public key of the pair being published, and the private key of the pair being stored securely on the patient's individual patient data storage device. In some cases, a patient can specify a set of parties to receive access to a specified portion of the patient's patient data. In some cases, this information is represented by encrypting with the patient's private key (1) information identifying the portion of authorized data, and (2) the public keys of the authorized parties. In some cases, this encrypted information is stored in a Block Chain-based distributed database. In some cases, access is provided to this authorized data by: (1) encrypting the data with a single-use symmetric key; (2) attaching to the encrypted version of the data, for each authorized party, and instance of the single-use key encrypted with the authorized party's public key; (3) and storing this information on a server, such as a record-completion server, together with the patient's patient identifier. Any of the authorized parties can access this data based upon the patient's patient identifier, and use its private key to decrypt the instance of the single-use key encrypted with its public key. The party then uses the decrypted instance of the single-use key to decrypt the patient data encrypted with the single-use key.

In some embodiments, instead of or in addition to storing the patient's encrypted medical records on the card, the facility stores them on an Internet-connected server. While the card is inserted, the reader device can use credentials for the patient, the reader, and the provider to identify, download, and decrypt medical records of the patient stored on an Internet-connected server. When the provider creates additional medical information for the patient, the reader uses the same credentials to encrypt and upload the additional information to the server. The encrypted patient information stored on the server can be backed up to guard against its loss. The encrypted data can be accessed and decrypted using the original card issued to the patient, or a replacement card containing the same credentials—along with credentials for a reader and a provider.

In some embodiments, new information can be added to a patient's electronic medical record as follows: first, the new information is either sent via fax to a fax server, or photographed and forwarded from a smartphone. Upon receipt, the facility OCRs this information in an attempt to match it to a particular patient, and extract relevant information such as the nature of the document. Digested in this way, the facility adds the document to a queue for review by a qualified person, who verifies that the document has been associated with the correct patient and has been interpreted correctly; authorizes adding it to that patient's electronic medical record; and determines what follow-up should occur in response to this new information, such as ordering a medical test, scheduling an appointment with a specialist, etc. The facility proceeds to act in accordance with reviewer's decisions.

In some embodiments, a smartphone app provides for the selective sharing of private documents. The app displays a list of the user's private documents, from which the user selects one or more documents for sharing. The user asks a person with whom the user wishes to share the selected document or documents to go to a particular URL in a web browser executing on a "sharee device" with which the selected documents are to be shared. When the page is downloaded and displayed, it contains visual information uniquely identifying the browser session in which the webpage is retrieved, such as a QR code. The user uses the app to capture this visual information from the person's display, using the smartphone's camera. In response, the app handshakes with the Web server, which makes the selected documents available to view, or to download, for a brief period within the browser session. In some embodiments, the app requires authentication by the user, such as via a fingerprint scanner, via facial and/or voice recognition, via password or numerical passcode entry, etc. In some embodiments, the Web server arranges for the web browser to receive decrypted versions of the selected documents that are stored in encrypted form, in such a way that the decrypted versions are never stored in the server; are only stored in the server in small sections; or are only stored in the server for a short period of time. In some embodiments, the Web server conveys the selected documents to the web client using one or more secure transmission techniques, such as the HTTPS protocol. In some embodiments, the user can specify within the app whether the person is able to download or only view the selected documents.

By performing in some or all of the ways described above, the facility facilitates geographically-diverse access to each user's individual information while at the same time maintaining a high level of security for this individual information.

Several use cases outlined below illustrate aspects of the operation of the facility in some embodiments and attendant benefits.

1. A first person collapses unexpectedly and is rushed to an Emergency Room. Under significant time pressure, the physicians decide to treat this patient with drug A. If, as is typical, the patient does not carry any personal medical information with her, her doctors are unable to learn that she is taking drug B, with which drug A has negative interactions. This treatment results in worsening condition for this patient, and may result in her death. These negative outcomes are avoided where her doctors are able to access a list of the patient's current prescriptions stored among her medical information on a portable storage device carried with her.

2. A second person encounters a serious chest pain, goes to see a doctor. Because he does not have personal health records with him, he is unable to identify two medications recently prescribed for him by a cardiologist. The doctor seeks from that cardiologist the identities of the prescribed medications, but the cardiologist is vacationing in a remote location beyond communications. The doctor orders exams and tests, then diagnoses the condition, and prescribes new medications. It turns out that all the same exams and tests had been done by the cardiologist earlier, and result in exactly the same prescriptions. Had this patient been carrying his medical information on a portable storage device, the prior testing, its results, and the resulting prescriptions would all have been available to the new doctor, and a substantial amount of effort on behalf of both the doctor and patient would have been avoided, along with significant expense.

3. A third person breaks his leg while on vacation. At an urgent care facility, he is diagnosed, using X-Rays, and is released with crutches and a CD-ROM containing the X-Ray images. A few days later, he feels sudden major pain and is quickly driven to a hospital Emergency Room. Due to rush, the patient forgets to bring the CD-ROM containing his X-Ray images. As is typical, the electronic health records system of this hospital does not exchange any information with the urgent care facility visited days earlier. The Emergency Room physicians obtain new X-Ray images, and base their treatment on them, which mirror those of the earlier X-Ray study. Here also, the effort, time, and expense of redundant testing are avoided where the results of earlier tests are stored in a portable storage device carried by the patient.

Such experiences are common among patients treated by modern healthcare providers, and can often be avoided where a patient carries personal health information with him or her in a secure form.

FIG. 1 is a device diagram showing components included in a data storage device used by the facility in some embodiments. FIG. 1 shows that, in some embodiments, the data storage device 100 is a smart card. The data storage device includes both user credential storage 132 and information storage 122. The user credential storage is storage capacity on the data storage device devoted to storing user security credentials, such as security certificates, keys, etc., that are representative of the user's authority to use the data storage device. The individual information storage contains individual information for the user, such as the user's health information, encrypted in such a way that user credentials, provider credentials, and reader credentials are all needed in order to decrypt them. A credential controller 131 controls and supervises access to the user credential storage, while an information controller 121 controls and supervises access to the individual information storage. The data storage device has one or both of electrical contacts 110 and an antenna 111 to communicate with the reader to permit the reader to access the user credentials and the individual information stored on the data storage device.

In some embodiments, one role of the data access device is to isolate the patient's card from being accessed directly. In some embodiments, the facility stores data on the card in a completely different format compared to what is presented by the data access device to service provider computer systems. This enables the data access device to validate and enforce data contracts and schemas, which ensures the integrity of the data, and removes the risk of unauthorized data to "travel" on the card.

In some embodiments, the data access device contains two independent, isolated areas—one handles encryption and security, while the other executes applications aimed and different forms of data processing. In some embodiments, everything related to security is "hardcoded," such that it cannot be changed or updated remotely. In some embodiments, parts of the data aggregation and de-identification controlling settings are "hardcoded" as well. For instance, when medical information is aggregated across patients, the facility can require that the reader only report aggregates for 10 or more patients.

Figure 2:
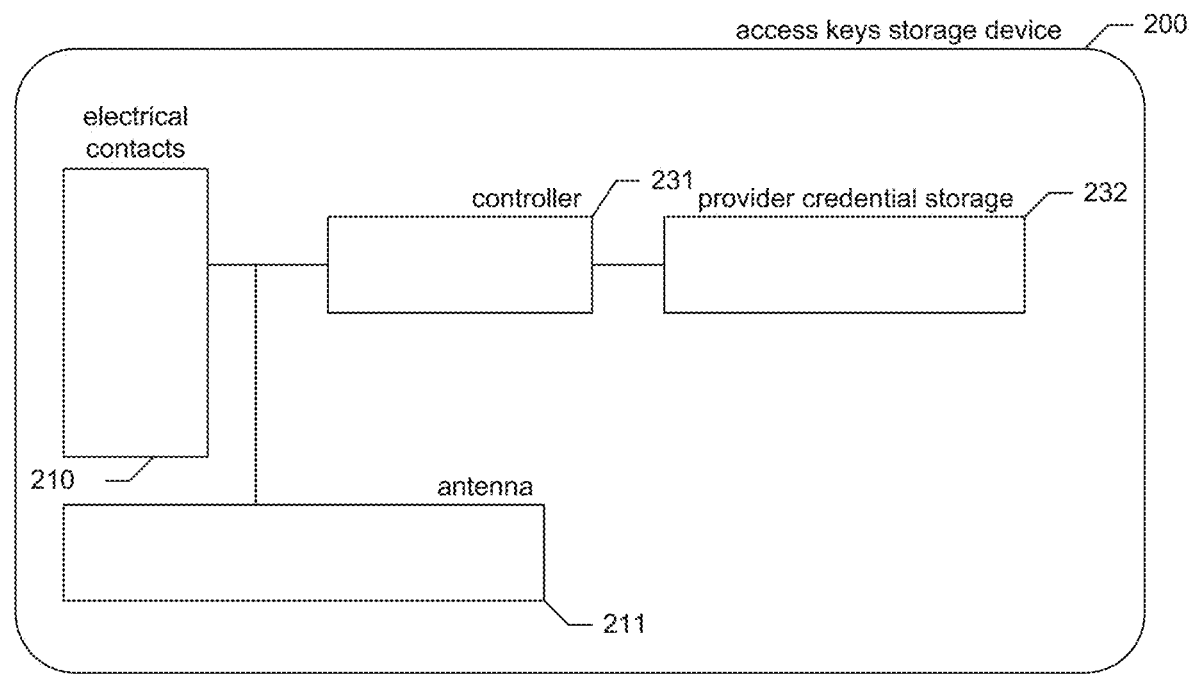
FIG. 2 is a device diagram showing an access keys storage device used by the facility in some embodiments.

FIG. 2 is a device diagram showing an access keys storage device used by the facility in some embodiments. In a manner similar to the data storage device, the access key storage device 200 contains credential storage 232 for the provider's credentials. A controller 231 controls and supervises access to the provider credentials in provider credential storage by the data access device. The data access device communicates with the access keys storage device through electrical contacts 210 and/or an antenna 211.

Figure 3:
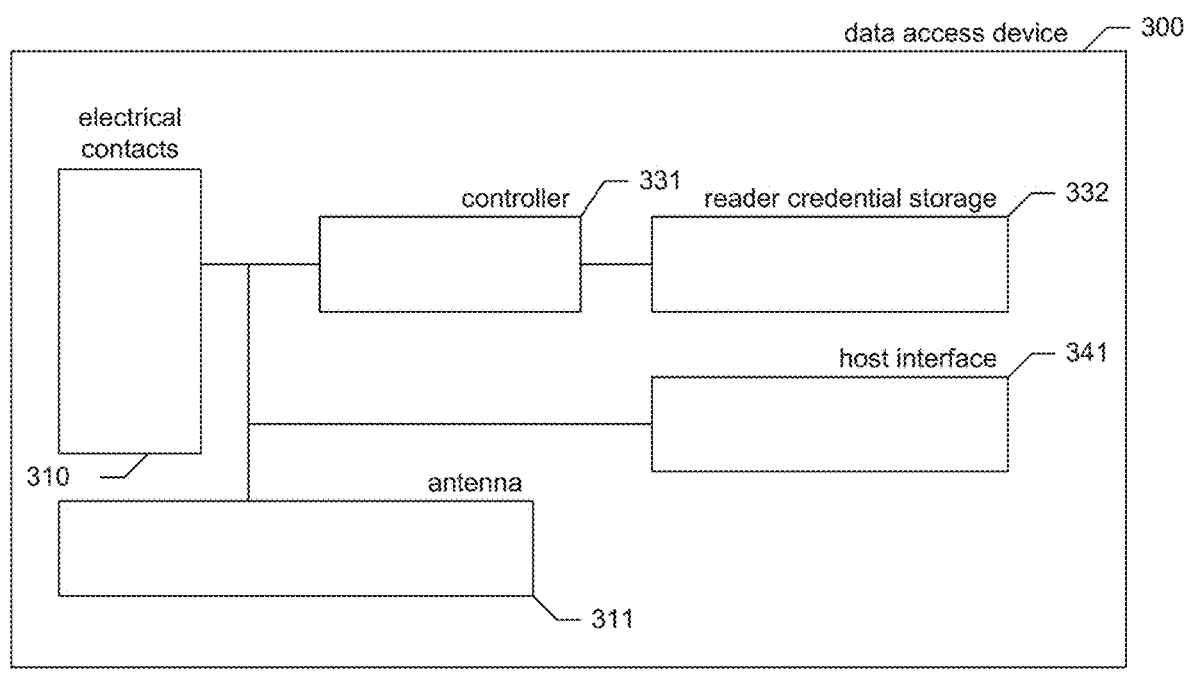
FIG. 3 is a device diagram showing a data access device used by the facility in some embodiments

FIG. 3 is a device diagram showing a data access device used by the facility in some embodiments. It can be seen that the data access device includes a host interface 341 connecting to a service provider computer system; electrical contacts 310 and/or an antenna 311 for communication with the data storage device and/or the access keys storage device; reader credential storage 322 for storing the data access device's credentials; and a controller 331 for managing interactions.

In some embodiments, the reader logs and signs any access to the data stored on the data storage device (both read and write, including the actual changes to the data) by the access key/signature stored securely on the access keys storage device.

In some embodiments, the data access device has a two-processor architecture to minimize any vulnerabilities related to its Data Encryption (or "Data Codec") Stack. The Data Processing Stack can be updateable (including, in some cases, remote updates) during the lifetime of the data access devices in order to support new and existing data formats and mappings, re-configure device-level processing algorithms and solutions including those for data filtering, setup particular aggregations, data abstractions and abstraction from personally identifiable information. On the other hand, the Data Codec Stack is protected from any changes or modifications as well as any attempts to extract the security data, information and algorithms from it; while the Data Processing Stack can be accessed, reconfigured and upgraded during the lifetime of the data access device, the Codec Stack is inaccessible after the initial initialization and virtually no information that may result in vulnerability can be extracted from it.

In some embodiments, the data access device performs hardware-level validation of the data and its format to ensure that only expected types of data are written and/or read from the data storage device, making it virtually impossible to share or distribute unauthorized data, viruses, etc.

Figure 4:
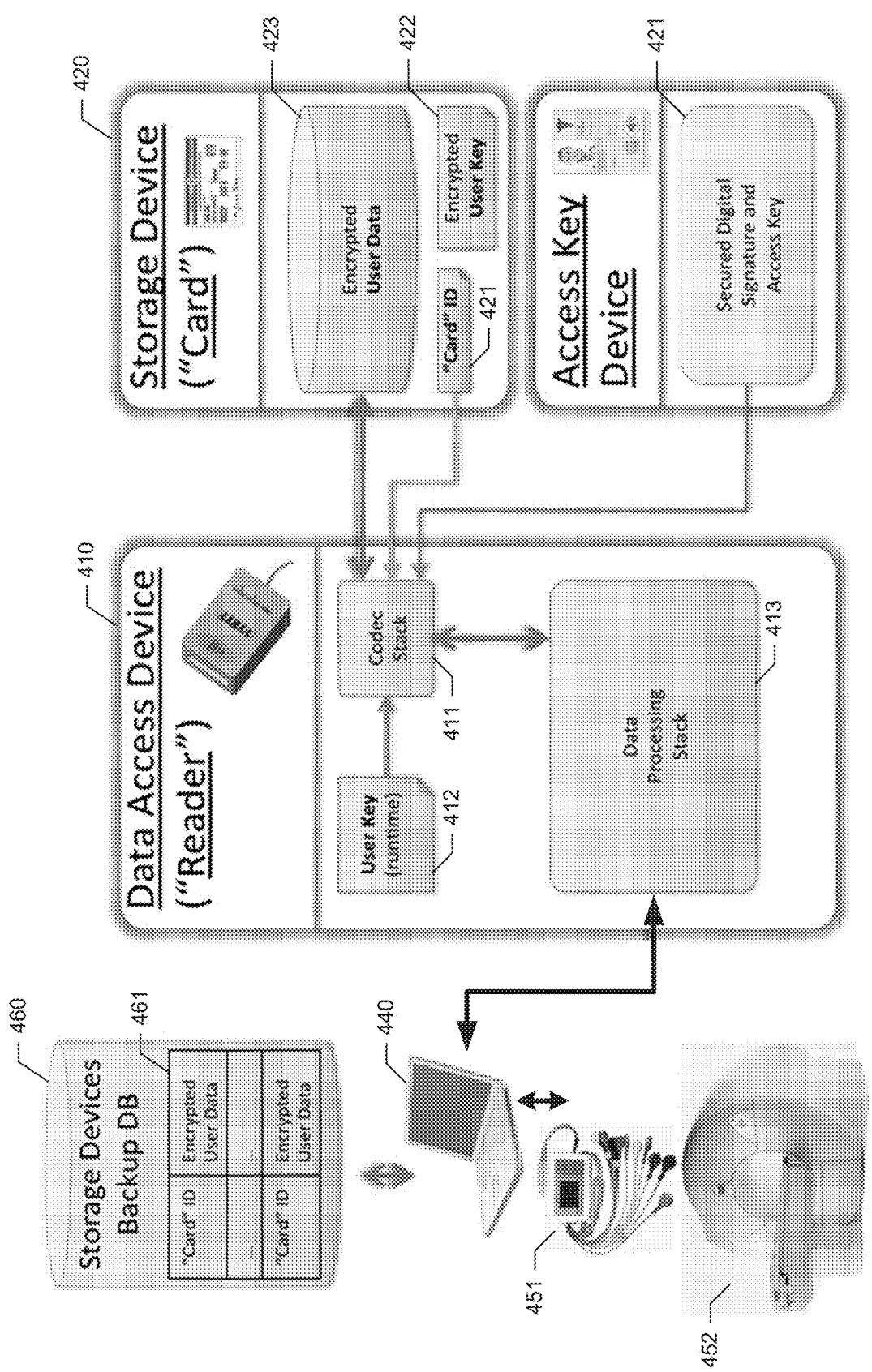
FIG. 4 is a data flow diagram showing data flow, data encryption and decryption, backup and data processing techniques used by the facility in some embodiments.

FIG. 4 is a data flow diagram showing data flow, data encryption and decryption, backup and data processing techniques used by the facility in some embodiments. It can be seen that a Codec Stack 411—the only physical place where User Data can be decrypted and encrypted—executes on a separate processor, which is physically isolated from application/processing parts of the data access device. The data access device also has a data processing stack 413 for interacting with a provider computer system 440, through which the reader can receive new health information, such as testing results from testing devices 451 and 452. As is discussed in greater detail below, through the provider computer system 440, the data processing stack can further submit encrypted individual information backups from the storage device that can be used if the storage device becomes lost or damaged to create the replacement. While the Data Processing Stack can be accessed, reconfigured and upgraded during the lifetime of the data access device, the Codec Stack is inaccessible after the initial initialization and virtually no information that may result in vulnerability can be pulled out of it.

Figure 5:
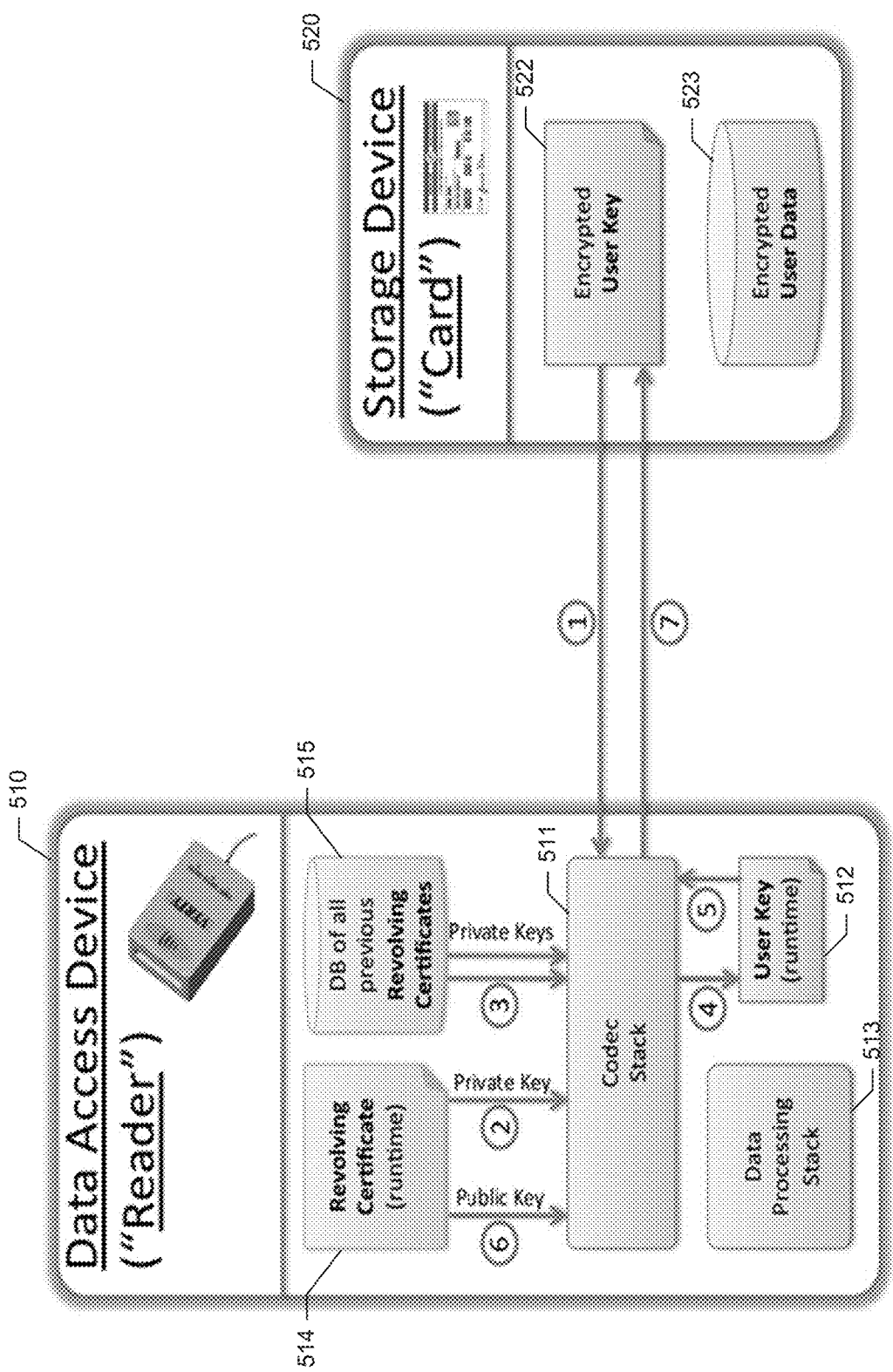
FIG. 5 is a data flow diagram showing a technique performed by the facility in some embodiments to reencrypt a data storage device's User Key with a newly updated Revolving Security/Encryption Certificate of the data access device.

FIG. 5 is a data flow diagram showing a technique performed by the facility in some embodiments to reencrypt a data storage device's User Key with a newly updated Revolving Security/Encryption Certificate of the data access device. The security certificate on the reader is issued by the health insurance company or another operating entity. This certificate is periodically renewed. Each time the patient's card is inserted into the data access device the card's security key is re-encrypted with the latest data access device's certificate. This way, readers that were de-certified by the operating entity lose the ability to decrypt card's key/certificate and use it to decrypt the actual payload. Since all the previous revolving certificates are stored on the data access device (in some embodiments in encrypted form), the data access device can decrypt the Encrypted User Key stored on the data storage device no matter how long ago the last access/re-encryption happened. Then the data access device re-encrypts the User Key with the most recent key and returns it back to the data storage device. This approach ensures that the data access devices that have not received the newest Revolving Certificate will lose the ability to access the data on the newly updated data storage devices.

In FIG. 5, Numbers in circles mark the sequence of steps in the data flow. In step 1, the data access device receives from the storage device the user key, encrypted with the latest revolving data access device certificate received by the data access device to write to the storage device. In step 2, the Codec Stack uses the private key of the latest revolving certificate received by the reader to attempt to decrypt the user key. If this is not successful, then in step 3, the Codec Stack repeats this process with each of the previously-received revolving certificates until the user key is decrypted. This produces, in step 4, a runtime copy 512 of the plain text user key. In steps 5 and 6, the Codec Stack uses the public key of the latest revolving certificate to reencrypt the plain text user key, and stores it in step 7 in the storage device in place of the former encrypted user key.

Figure 6:
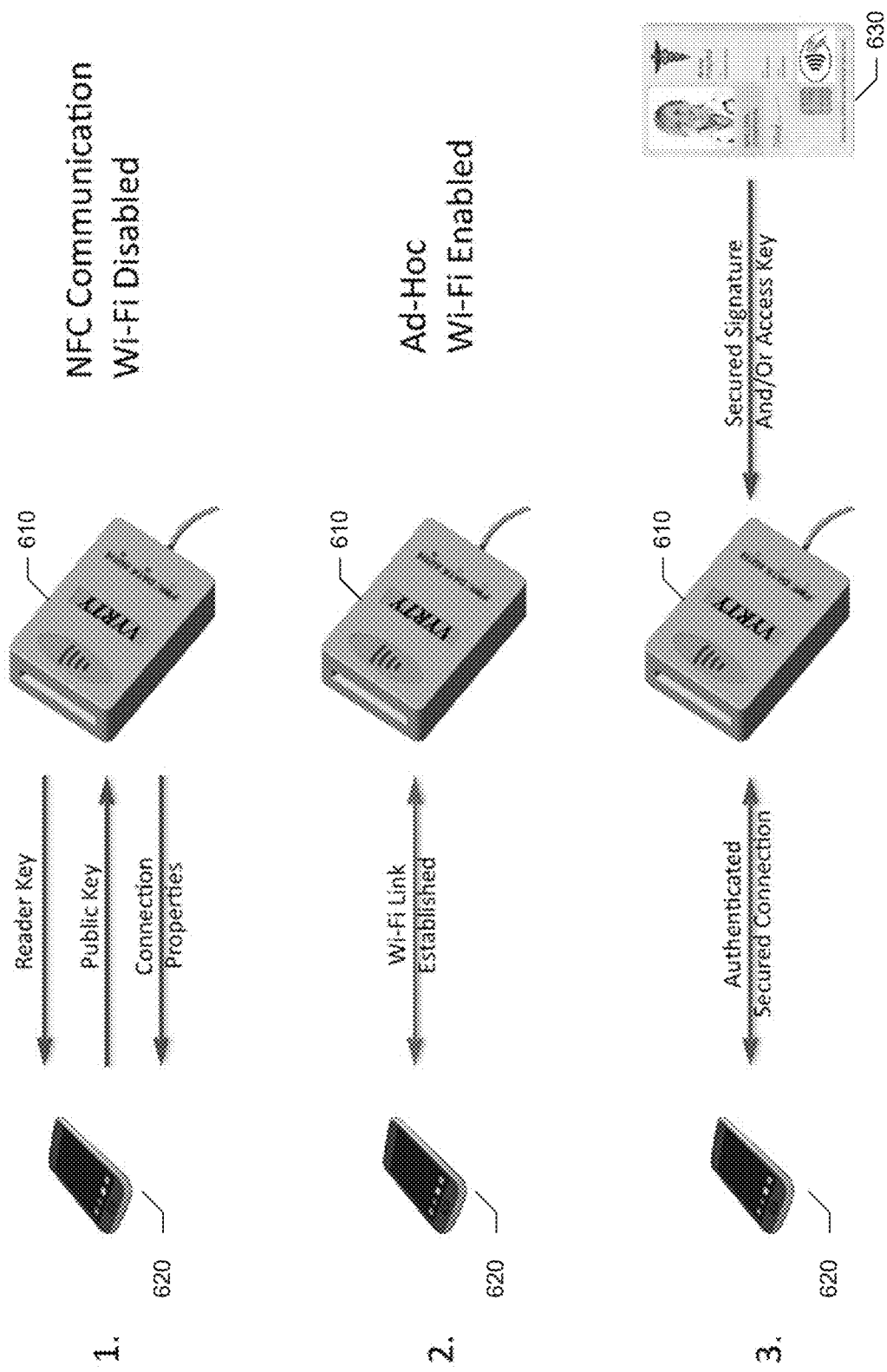
FIG. 6 is a data flow diagram showing a protocol used by the data access device to communicate with this smartphone in some embodiments.

In some embodiments, the user credentials and user's encrypted data are stored on a smartphone belonging to the user. FIG. 6 is a data flow diagram showing a protocol used by the data access device to communicate with this smartphone in some embodiments. During a first phase, the reader 610 disables WiFi communications and enables NFC communications. In this phase, the data access device 620 sends the cell phone a public key of the reader; the cell phone sends the data access device a public key of the user; and the data access device sends connection properties to the smartphone. In a second phase, the data access device turns on WiFi communications, and the smartphone uses the connection properties sent by the access device in the first phase in order to establish a WiFi connection with the access device. In some embodiments, before the smartphone provides the user's public key, or before the smartphone establishes the WiFi link, it explicitly seeks and obtains authorization from the user to connect with the access device. In a third phase, the access device uses the established WiFi connection in order to access the user's credentials and encrypted data on the smartphone. Also during this phase, the access device uses the user credentials together with credentials from the service provider 630 and credentials of the access device to decrypt, read, and write the user's encrypted data.

In various embodiments, the facility uses various other protocols to establish a secure, authenticated connection between the smartphone and the access device, using any of a variety of wireless communication techniques and authentication techniques, also including, for example, Bluetooth, and Internet access via a WiFi or cellular data connection.

Figure 7:
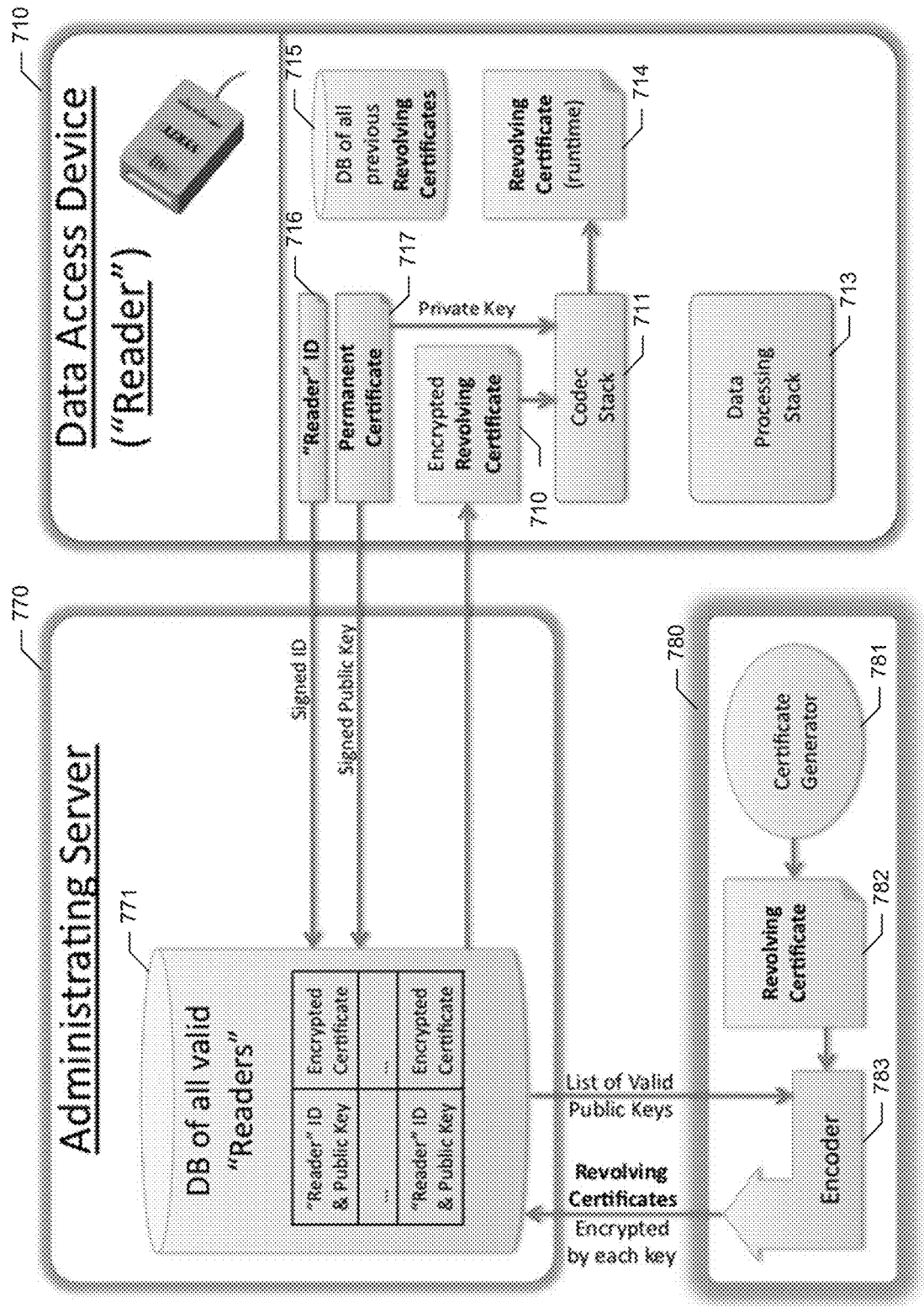
FIG. 7 is a data flow diagram showing a process used by the facility in some embodiments to periodically update the revolving security/encryption certificate on the data access device.

FIG. 7 is a data flow diagram showing a process used by the facility in some embodiments to periodically update the revolving security/encryption certificate on the data access device. The data access device re-encrypts each data storage device's User Key with the latest Revolving reader Certificate each time the data storage device is accessed.

In some embodiments, a certificate generator 781 that executes in an isolated offline environment periodically generates a new revolving certificate 782, such as monthly. Then an encoder 783, which runs in the same environment, encrypts this Security Certificate with the Public Key of each valid (and authorized) data access device 710 listed in reader database 771. The resulting list is stored on Administrating Servers 720, which are directly accessed by the data access devices to receive their copies of new revolving certificates. By removing a data access device from the database of valid readers, the facility prevents a removed data access device from being able to retrieve the current revolving certificate encrypted with its public key, i.e., encrypted in a way that it is able to decrypt with its private key.

A data access device maintains a local copy 715 of the list of all valid encryption/access keys (or certificates), or at least the unique IDs of those for the read-time validation of the changes made on the patient's card by other parties. In some embodiments, the governing (or administration) body of the particular organization maintains the database of all and each issued (and respectfully stored on each Physician's RFID card) encryption/access keys (or certificates). In some embodiments, each data access device periodically synchronizes with such central database.

In some embodiments, the data access device maintains whitelists and/or blacklists of keys or signatures for both users and service providers as a basis for controlling access to data storage device contents.

While FIG. 7 shows the Data Access Device sending a signed public key to the Administrating Server, in some embodiments the Data Access Device does not send a signed public key to the Administrating Server.

In some situations the data storage device can be disconnected or removed from the data access device before the new data record is completed and ready to be stored on the data storage device. In this case one or multiple online or otherwise connected storage devices, servers or services can be used for temporarily storing the new data (and complimenting data) that hasn't yet made its way to the data storage device.

Figure 8:
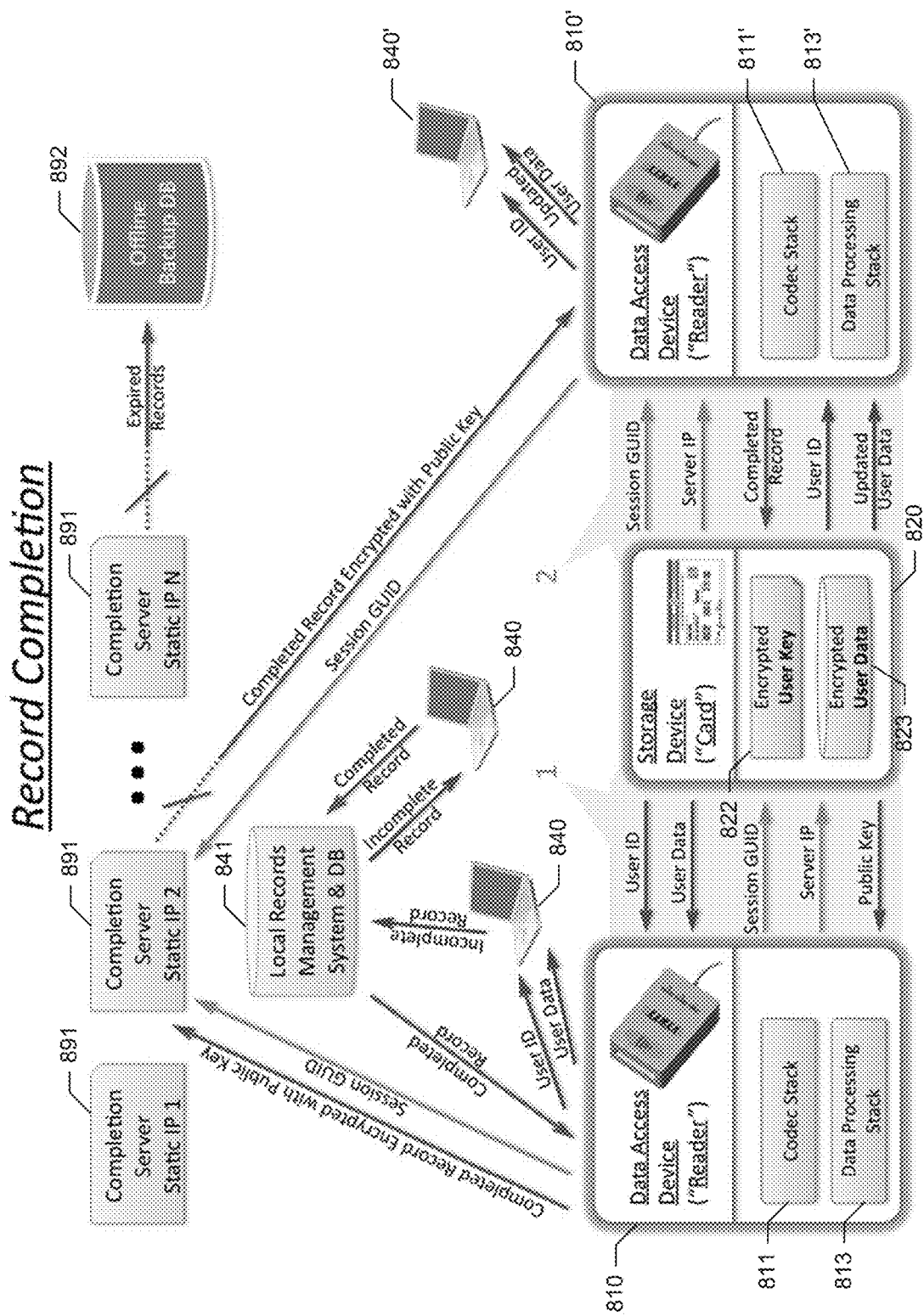
FIG. 8 is a data flow diagram showing a record completion process performed by the facility in some embodiments when the data storage device becomes disconnected, unplugged, or becomes otherwise inaccessible before a new data record is completed.

FIG. 8 is a data flow diagram showing a record completion process performed by the facility in some embodiments when the data storage device becomes disconnected, unplugged, or becomes otherwise inaccessible before a new data record is completed.

At a first stage (shown as highlighted area #1), the data storage device 820 is connected and communicating with a first data access device 810. "User ID" and "User Data" (which may be empty, or may contain previous data records) are accessed and decrypted by the data access device. The first data access device generates a "Session GU ID" identifying a record completion session and stores it on the data access device. The first data access device requests the "public" part of the asymmetrical security certificate of the data storage device and temporarily caches it inside own memory. In some embodiments, the expiration of such cache is configurable. The first data access device allows the connected PC, Tablet or another type of connected provider computer or device 840 to access "User ID" and "User Data" in order to initiate a new data record. The first data access device randomly (or according to some set of rules) selects the Static IP address (or other identification) of the server, service, or device 891 it is planning to use for the temporary data record storage. The data access device stores this IP address or another identification on the data storage device. At this or later stage (potentially before the new data record is completed), the data storage device is disconnected from the data access device and becomes therefore inaccessible to the first data access device. The new data record gets completed on the same computer or device to which the data access device is connected, or on another device or computer (in the situation where data records are managed from and by a local records management system and are getting stored in the respective DB). The data access device (having ways to communicate with the computer or the DB containing the new data records) detects (through a particular pull or push protocol) that the record is ready. In some embodiments, it need not be absolutely finished at this stage, but it is in a usable form in accordance with a particular set of definitions. In some embodiments, record completion can be initiated manually; for example, a service provider can use his or her computer to explicitly notify the data access device when a record is complete. The data access device encrypts the new data record with the "public" key previously cached from the presently inaccessible data storage device. The data access device sends the encrypted new record for temporary storage on the previously selected server, service, or device.

In a second stage (shown as highlighted area #2), the data storage device is connected to the same or a different data access device 810'. At this stage, the data access device detects one or more "Session ID's" each identifying a data record that was not yet complete at the last time the data storage device was communicating with any data access device. Each such data record may now be complete, or may still be incomplete. The data access device then pulls the corresponding "Server IP address" (or other identification) of the server, service, or device the respective record was originally stored on, establishes an appropriate connection, and downloads the previously stored encrypted data record. The data access device updates the user data on the data storage device with the new data record. The data access device pulls the "User ID" and the "User Data" updated with the new data record from the data storage device, then decrypts it and verifies its validity and integrity. Once confirmed, the data access device sends the confirmation to the server, service, or device (that was used as a temporary storage) requesting this data record be deleted and cleans up the records on the data storage device. Where the data record is not requested from the temporary storage location within the predefined expiration period, it can be sent to an offline storage/backup location and deleted from the temporary storage. In some embodiments, the facility randomly selects a server from the collection of servers for the temporary storage of the data record. In some embodiments, the facility randomly selects a service from the collection of services for the temporary storage of the data record. In some embodiments, the facility randomly selects a device from the collection of devices for the temporary storage of the data record. In some embodiments, the facility uses temporary storage (servers, services, or storage devices) for storing only a delta or difference between the data that was already stored on the data storage device at the time it was disconnected or became otherwise inaccessible and the completion (by the variety of definitions) of the corresponding record. In some embodiments, the facility uses pairs of randomly selected server, service or device identification and randomly generated "Session ID" for finding the respective record.

In some embodiments, the facility deletes the record after the respective "User Data" is confirmed correctly updated. In some embodiments, the facility uses asymmetrical encryption approaches for delta (difference in data records) encryption for the temporary storage of such data record. In some embodiments, the facility accesses the new data record only as a part of the "User Data" only from the data storage device only after it's updated with the new data record. This means that the data record that was downloaded from the temporary storage is meaningless by itself; it cannot be decrypted or otherwise used as a standalone record.

Figure 9:
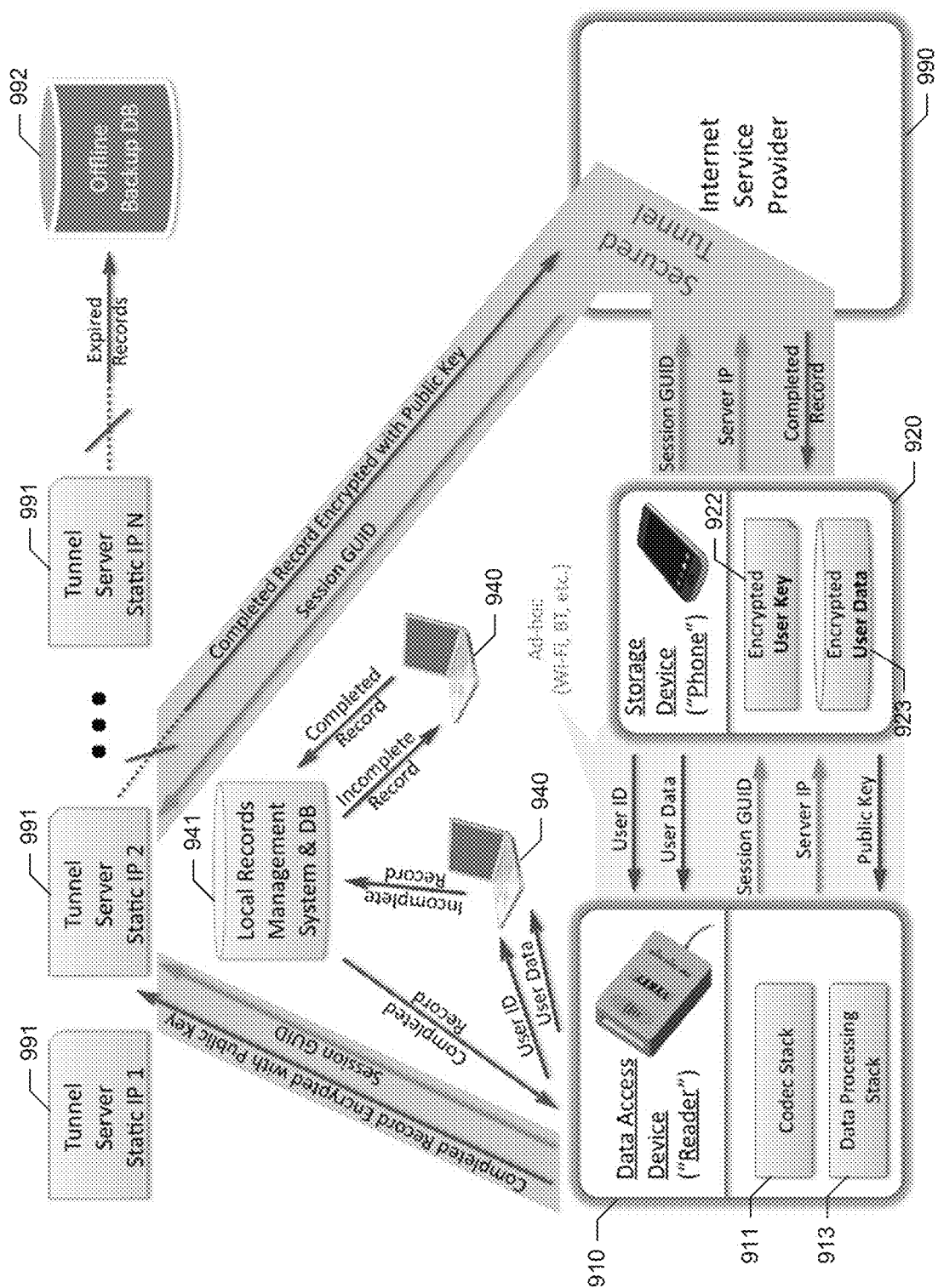
FIG. 9 is similar to FIG. 8 discussed above, and shows the record completion process where a user's smartphone 920 is used to store the user's credentials and encrypted data.

FIG. 9 is similar to FIG. 8 discussed above, and shows the record completion process where a user's smartphone 920 is used to store the user's credentials and encrypted data. The technique is similar to that shown in FIG. 8, except that the smartphone uses its own capability 990 to access the Internet—e.g., via a WiFi or cellular data connection—to communicate directly with the completion server that was selected for the incomplete record, via a secured tunnel.

In some embodiments, the secure patient data storage devices have features that make them usable by unsophisticated or less well-equipped healthcare providers. In some embodiments, the user's smart card bears a fax number having a one-to-one correspondence with the user. A healthcare provider who is unable to store information on the user's smart card via the reader—or, in fact, a healthcare provider who does not have a working reader—can use a fax modem, an optical fax machine, or an email-to-fax service, for example, to send documents containing the information to be stored as a fax to the fax number borne by the user's smart card. In response, the facility loads the faxed documents onto a proxy server dedicated to the current user; this proxy server encrypts the data with a public key associated with the user and upload it to completion server along with a predefined session identifier. This server does not keep the copy of user records. Encryption can be implemented using special hardware that prevents user public key leak even in cases of server compromise. When the user's smart card is subsequently inserted into a reader at another provider's office, the reader retrieves the documents from the completion server and stores them on the user's smart card. In some cases, the reader does additional processing to, for example, perform optical character recognition on the documents; extract certain information from the documents for storage in a database; rotationally or translationally true the documents; scale the size of the documents; etc. Similarly, in some embodiments, the user's smart card bears an optical VR code that a healthcare provider can scan with a smartphone, then use the smartphone to upload document images or electronic documents to a completion server for later storage on the user's smart card.

Figure 10:
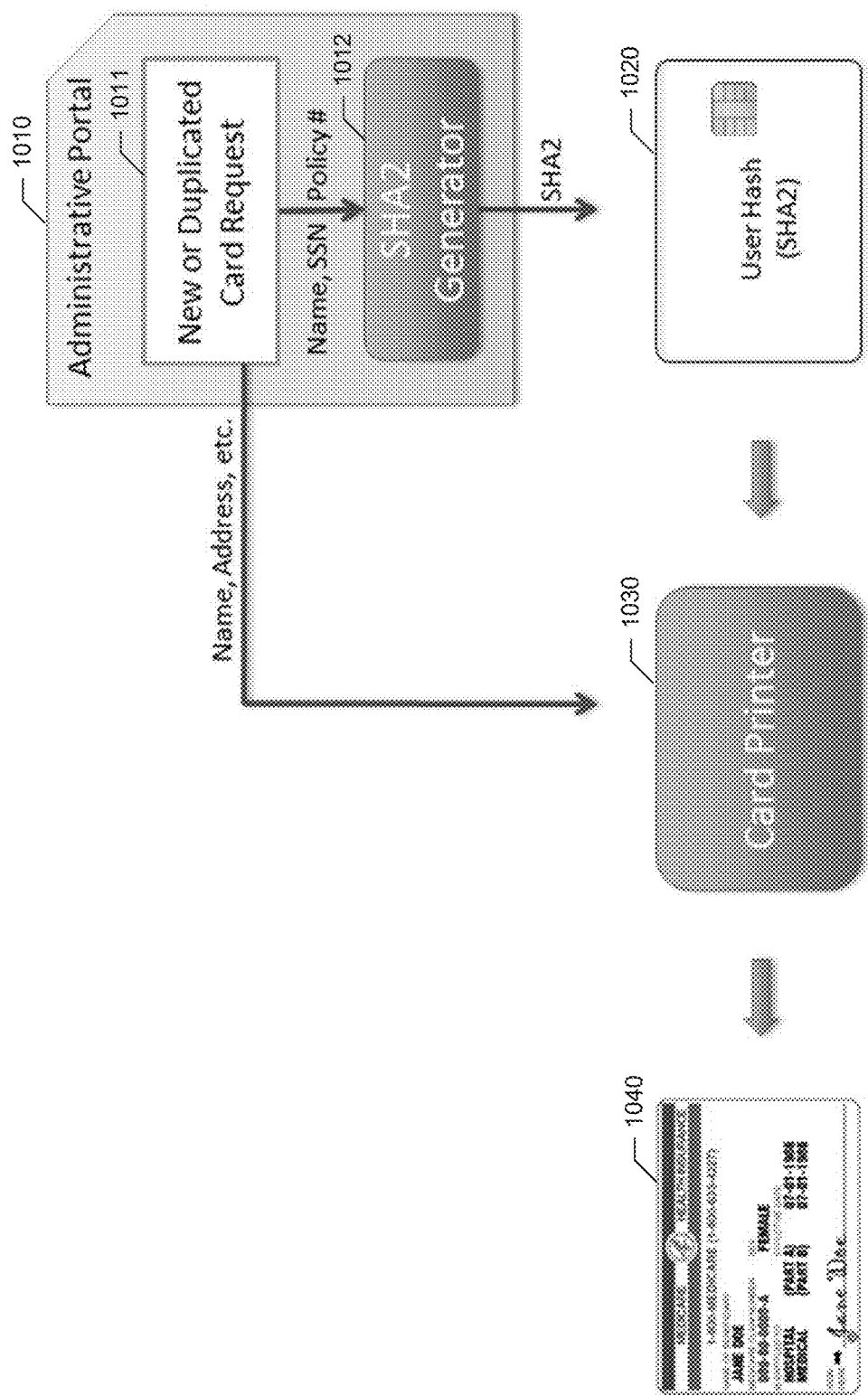
FIG. 10 is a flow diagram that shows a first stage of a card generation process performed by the facility in some embodiments.

FIG. 10 is a flow diagram that shows a first stage of a card generation process performed by the facility in some embodiments. In an Administrative Portal 1010, an administrative user enters a card request 1011 including parameters of a new or existing user for which a card is to be created. These parameters are typically invariant with respect to the user, such as Name, Gender, DOB, etc. This occurs both when the facility is generating the first data storage device for a user, and where the facility is generating a subsequent data storage device for the user to replace a lost or damaged data storage device of the user. The facility uses a hashing generator 1012 to generate a unique hash for the user (for example, a SHA2 or MD5 hash) based on the user parameters. The facility copies the unique user hash onto a blank Card 1020. The user parameters are used by a Card Printer 1030 to print human-readable information on the Card, such as user name, sex, identification number, coverage details, signature, etc. Now the Card 1040 is ready to be initialized with the Card Certificate.

Figure 11:
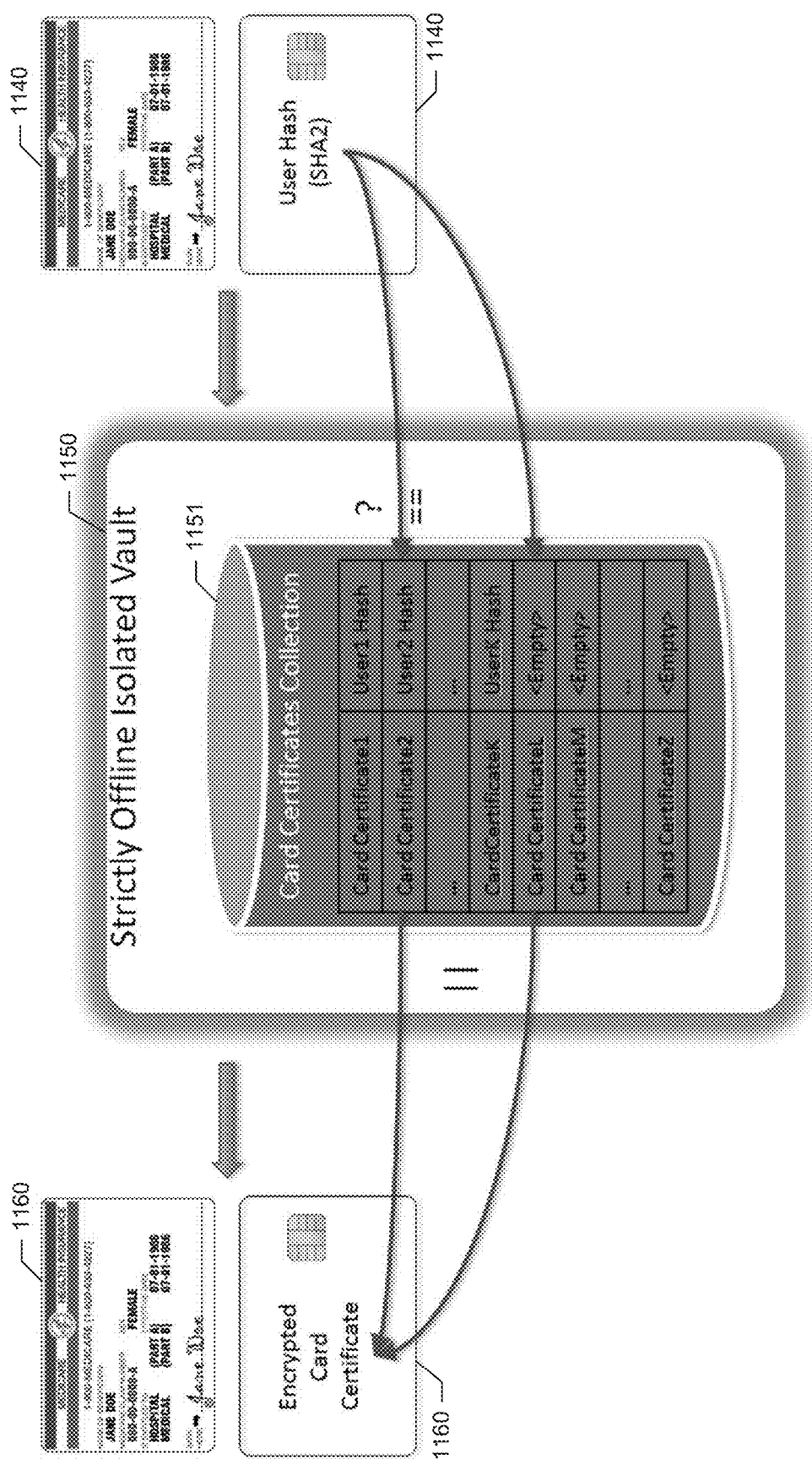
FIG. 11 is a flow diagram that shows a second stage of the card generation process performed by the facility in some embodiments.

FIG. 11 is a flow diagram that shows a second stage of the card generation process performed by the facility in some embodiments. A Card Certificates Collection 1151 is a database that is initialized once with a very large number of randomly generated Card Certificates, such as one billion, each encrypted using an initial Reader Certificate. In some embodiments, the card certificates collection is stored in a physically and communicatively isolated vault 1150 into which no wired or wireless network connections pass. The new Card 1140 containing a User Hash identifying the user is connected to the Card Certificates Collection. In some embodiments, the user hash is a hash value generated by performing a consistent hashing algorithm against identifying information for the user, such as social security number, normalized name, etc. In some embodiments, the user hash is an arbitrary identifier for the user that is otherwise mapped to from identifying information for the user. If this User Hash already exists in the DB (meaning we are restoring lost/stolen/damaged Card), then the facility copies the corresponding encrypted Card Certificate onto the Card. Now this Card is ready for User Payload Data to be restored from the Backup DB. If this User Hash cannot be found, meaning that it is a new User, then the facility copies the User Hash to the next "Empty" slot of the DB, and copies the corresponding Card Certificate onto the Card. Now the Card 1160 is ready to be securely conveyed to the User, such as via trackable mail, in person pick-up, etc.

Figure 12:
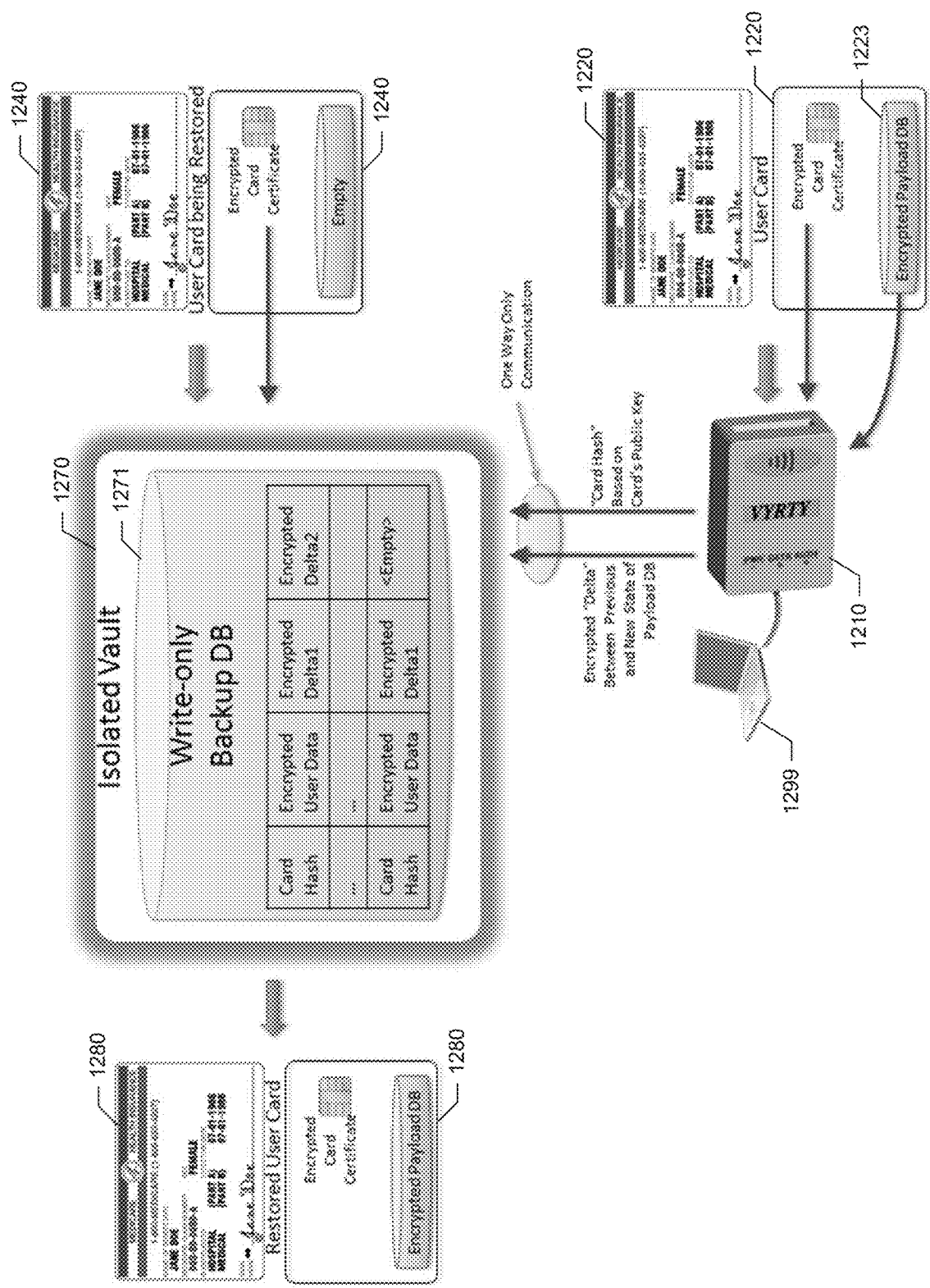
FIG. 12 is a data flow diagram showing a backup operation performed by the facility in some embodiments to be able to replace the contents of a lost or damaged data storage device.

FIG. 12 is a data flow diagram showing a backup operation performed by the facility in some embodiments to be able to replace the contents of a lost or damaged data storage device. After the reader performs each Payload DB update on the Card 1220, the Reader 1210 encrypts the Delta (difference) between the new state and the previous state of the Payload DB 1223 using Card's Public Key and sends it to the Backup DB 1271 in an isolated vault 1270 together with the Card Hash generated based on the same Public Key via a "One Way" type of communication channel. For example, in some embodiments, to implement one-way communication, the facility uses an optical communication link in which the receiving end has an optical sensor, and only the transmitting end has a light emitter. Only the encrypted and de-identified data payload can be copied from the card for the backup processes; the key/certificate and anything related to personally identifiable information cannot be extracted from the card. In some embodiments, the backup server signs backup copies for guaranteed verification/validation of backup transactions. This way data that is restored from the backup can be verified for validity. In some embodiments, a delete operation can only occur on the Patient's Card if online backup of the respective files has succeeded. The backup server confirms backup transaction by returning encrypted and signed confirmation.

For restoration from the Backup DB, a new Card 1240 with the same Card Security Certificate is used. A Card Hash is generated from the Public Key of the new Card using the same hashing algorithm. Where the Card Hash matches the existing entry, the encrypted Payload entries are copied on the Card. The Card 1280 now is ready to be securely transported to the User.

Figure 13:
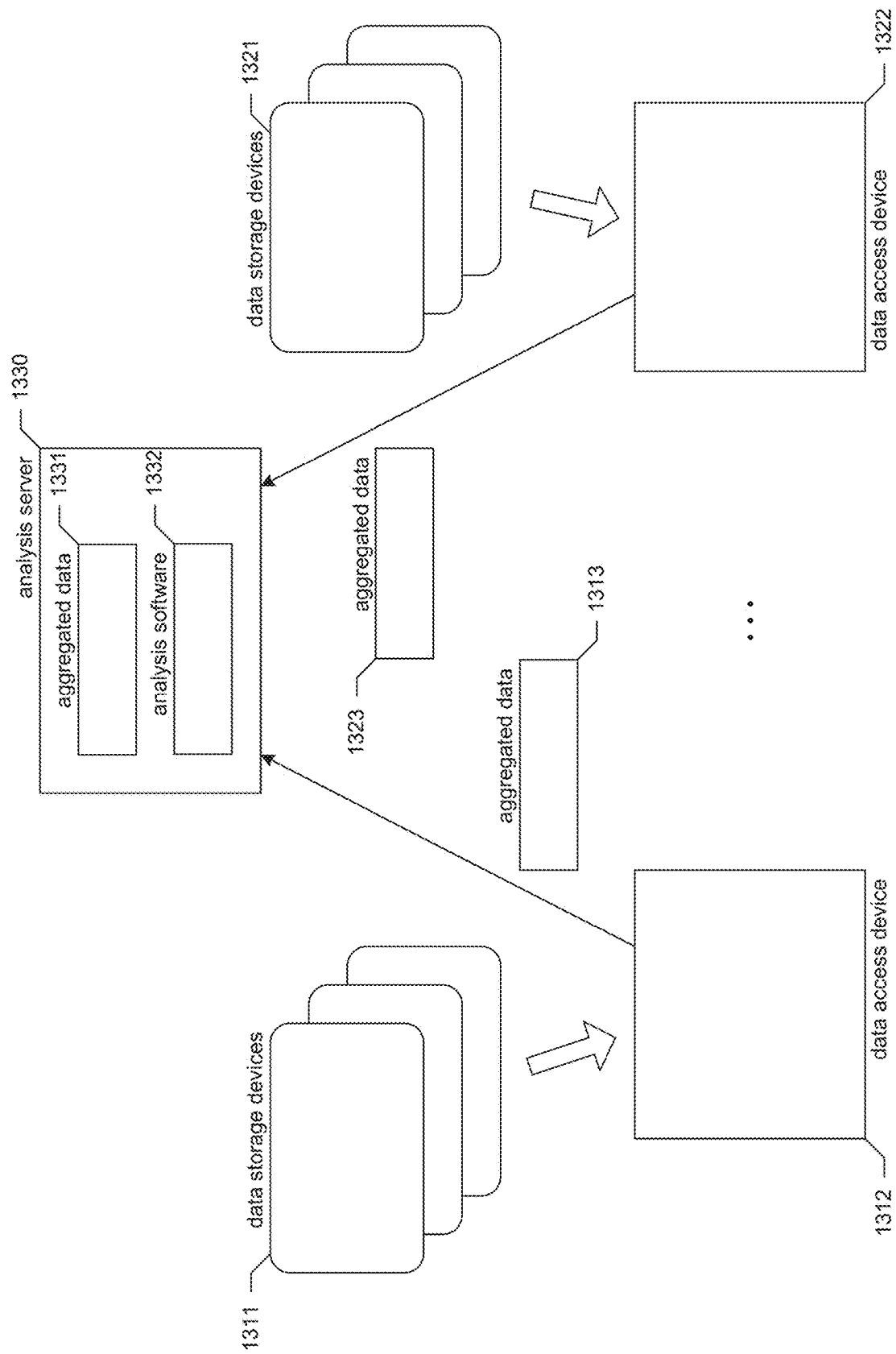
FIG. 13 is a data flow diagram showing an aggregate data analysis process performed by the facility in some embodiments.

FIG. 13 is a data flow diagram showing an aggregate data analysis process performed by the facility in some embodiments. For example, in some embodiments, the facility performs data analysis to discern health and/or treatment trends among patients using the facility. In this data flow, a data access device such as data access device 1312 aggregates certain data from among the data storage devices 1311 with which it interacts. Periodically, the data access device sends this aggregated data 1313 to an analysis server 1330. In some embodiments, there's a lower limit on the number of patients whose data can be incorporated in a batch of aggregated data 1313 sent to the analysis server, such as 10 patients. In the analysis server, the facility collects the aggregated data 1331 from across multiple data access devices, subjects it to analysis techniques implemented by analysis software 1332.

In some embodiments, in order to more securely send data aggregated from a small number of patients from the data access device to the analysis server, the facility first performs statistical obfuscation on this aggregation result. In particular, each reader that has an aggregation result based on a small number of patients alters the aggregation result in a random fashion before sending it to the analysis server. If one of these transmissions is intercepted and decrypted, there is no information available to determine in what direction and to what degree it has been altered. On the other hand, readers that have an aggregation result that is based on a large number of patients send their aggregation results to the analysis server unaltered.

The analysis server aggregates the aggregation sent from the readers, some of them altered and some unaltered. In this phase of aggregation, the random alterations of the aggregation results generated by the readers largely cancel out, producing a final aggregation result that has a high probability of relative accuracy. In some embodiments, if particularly high accuracy is desired, a consumer of the final aggregation can choose to include in it only reader aggregation results that have not been altered, i.e., those that are based on a large number of patients.

In some embodiments, the facility alters an aggregation result that is based on a small number of patients as follows: The facility defines an interval [n1, n2] of unaltered values that should be obfuscated and an interval [k1, k2] (k1<n1, n2<k2) into which the altered aggregation result will fall. The facility further picks a stochastic function f(x) that maps the first interval into the second; the mean value of this function equals the function argument: m{f(n)}=n. For example, in some embodiments, the facility creates this function as follows: first, the facility subdivides the target interval into the subintervals [k1, R] and [R, k2], where R is the unaltered aggregation result. Next, the facility randomly chooses one of these two intervals, weighting the random selection such that the first subinterval has a likelihood of selection proportional to the size of the second subinterval (k2−R), and the second subinterval has a likelihood of selection proportional to the size of the first subinterval (R−k1). Finally, the facility randomly selects an altered aggregation result value within the selected subinterval, the likelihood of selection being uniform across the selected subinterval. An example implementation of the algorithm for obfuscation measurements from interval [0, n] (k1<0, k2>n) is as follows:

```
static int Stochastic(RandomGen rnd, int msm, int k1, int k2)
{
    var r0 = rnd.NextDouble( ) * (k2 − k1) + k1;
    if (r0 < msm)
    {
        return rnd.Next(msm, k2 + 1);
    }
    else
    {
        return rnd.Next(k1, msm + 1);
    }
}
```

Figure 14:
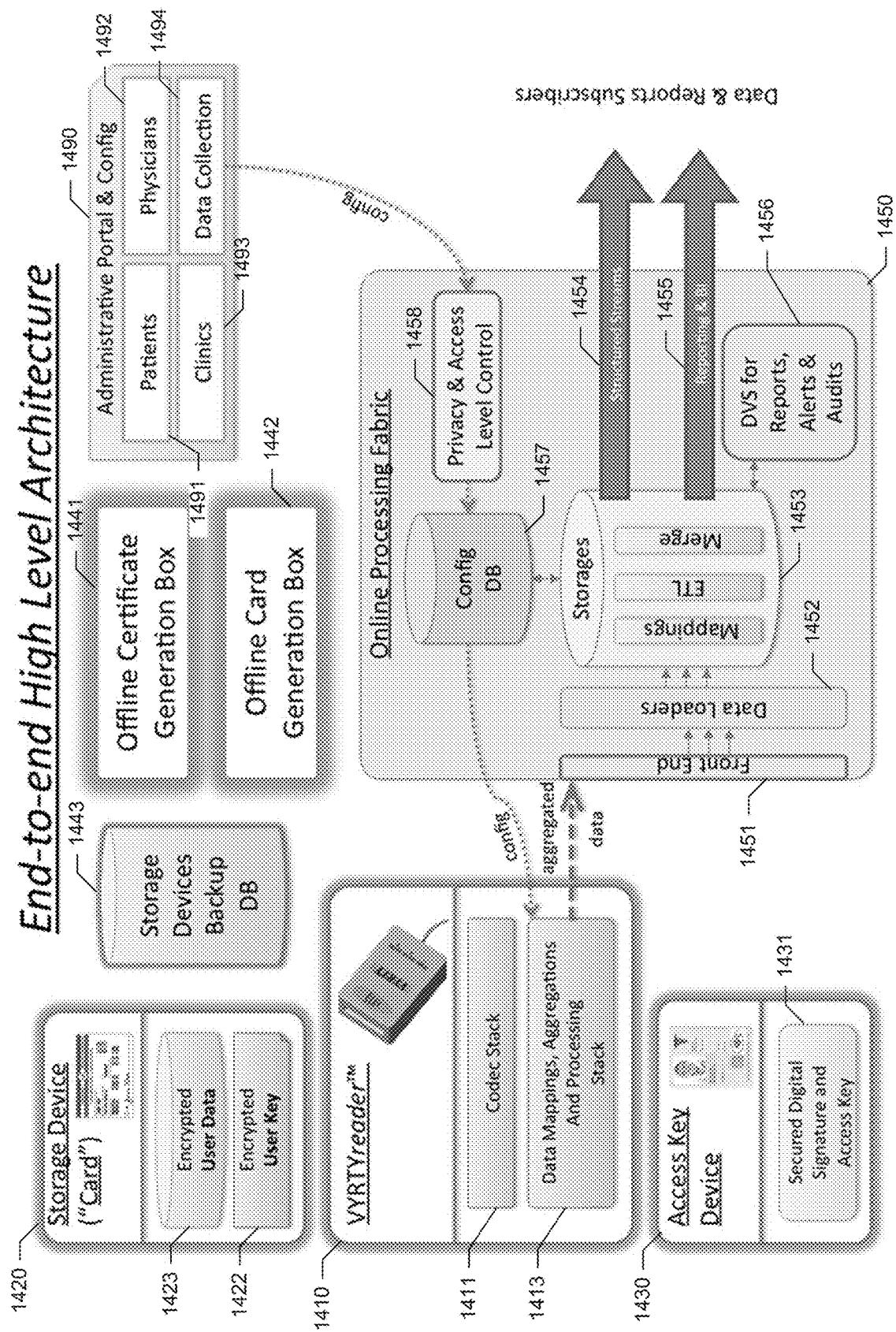
FIG. 14 shows an end-to-end high-level architecture employed by the facility in some embodiments.

FIG. 14 shows an end-to-end high-level architecture employed by the facility in some embodiments. It can be seen that de-identified, aggregated, statistical, and instrumentation data is sent to an online processing fabric for further consumption.

Figure 15:
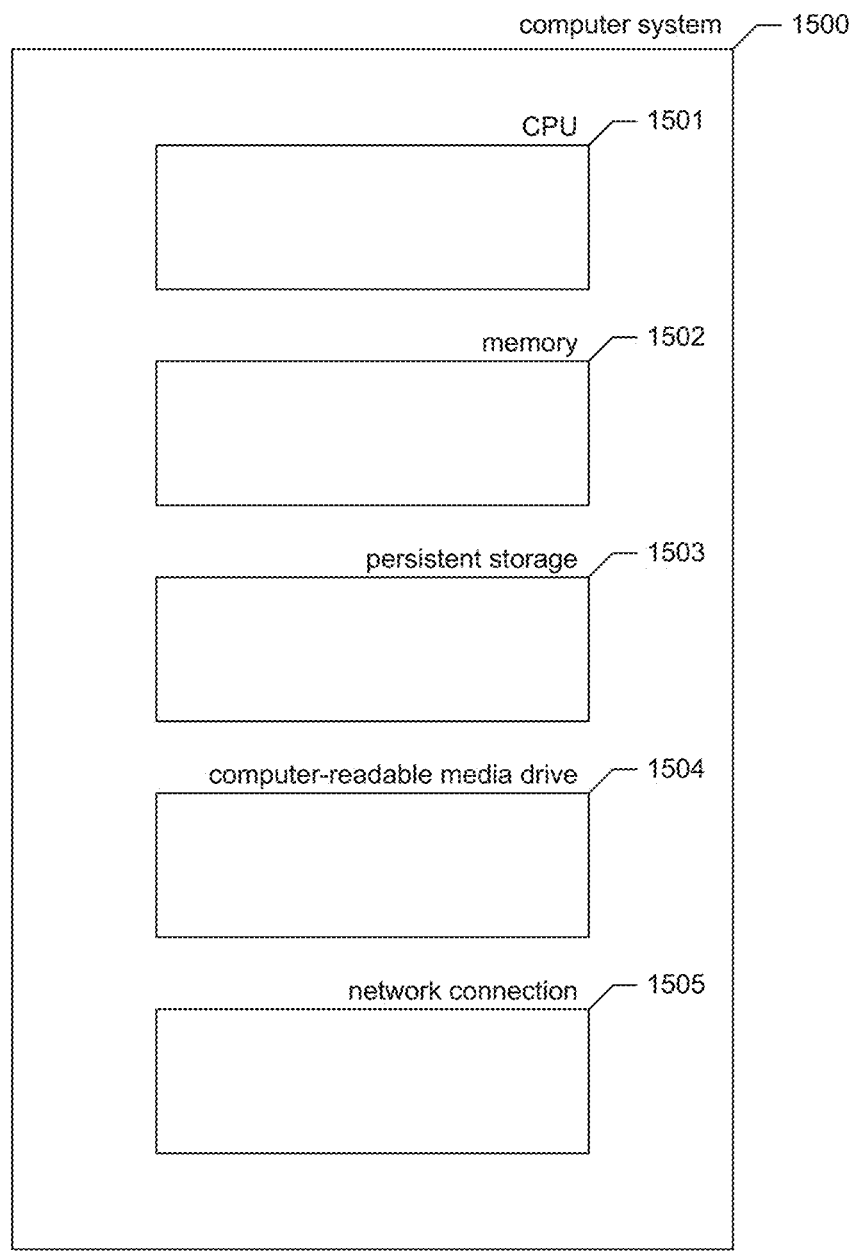
FIG. 15 is a block diagram showing some of the components typically incorporated in at least some of the computer systems and other devices on which the facility operates.

FIG. 15 is a block diagram showing some of the components typically incorporated in at least some of the computer systems and other devices on which the facility operates. In various embodiments, these computer systems and other devices 1500 can include server computer systems, desktop computer systems, laptop computer systems, mobile phones, personal digital assistants, televisions, cameras, automobile computers, electronic media players, etc. In various embodiments, the computer systems and devices include zero or more of each of the following: a central processing unit ("CPU") 1501 for executing computer programs; a computer memory 1502 for storing programs and data while they are being used; a persistent storage device 1503, such as a hard drive or flash drive for persistently storing programs and data; a computer-readable media drive 1504, such as a floppy, CD-ROM, or DVD drive, for reading programs and data stored on a computer-readable medium; and a network connection 1505 for connecting the computer system to other computer systems to send and/or receive data, such as via the Internet or another network and its networking hardware. While computer systems configured as described above are typically used to support the operation of the facility, those skilled in the art will appreciate that the facility may be implemented using devices of various types and configurations, and having various components.

In some embodiments, the facility stores individual information of a variety of types. For example, in some embodiments, the facility stores individual information relevant to financial services. In various embodiments, such information can include social security numbers and other identifying information, credit score, employment history, account numbers and balances, information about financial instruments and other property presently or formally owned and its value at various times, investment strategies and histories, etc. In some such embodiments, data access devices are provided to service providers such as bank branches, investment advisors, employers, loan underwriters, retirement and other financial planners, etc.

In some embodiments, the facility stores individual information comprises travelling information. In a variety of such embodiments, such information can include traveler identification information, traveler citizenship information, traveler residency status, information regarding government-issued travel documents such as passports and visas, travel history, photographs, licensure for automobile driving and other forms of vehicle control, etc. In some such embodiments, data access devices are provided to customs and border patrol agents, government passport and visa authorities, travel agents, airlines and other travel providers, etc.

In some embodiments, the facility stores individual information relating to education, training, and/or profession certification. In a variety of such embodiments, the individual information includes educational information regarding institution, classes, grades, instructors and educational facilities, admissions examinations, completion examinations, degrees conferred, professional certifications and their statuses, etc. In some such embodiments, data access devices are provided to educational institutions and instructors, professional certification authorities, employers, etc.

In some embodiments, the facility caches in a reader information from each of one or more storage devices, such as a reader into which this these storage devices have been inserted or with which the storage devices have otherwise communicated. In some embodiments, this includes one or more encryption keys or other credentials stored on the storage device. In these embodiments, the facility can perform certain operations in the absence of the storage device that would normally require the presence of the storage device, such as the decryption of certain information that relies on access to some or all of these keys or other credentials.

In some embodiments, the facility writes data to a storage device from a writing device into which the storage device was never inserted, and/or with which the storage device has not directly communicated. For example, where blood tests are ordered for a patient, a computer at the lab that generates the results of these blood tests can directly transmit these results to a completion server from which the facility can download the results to the storage device, despite the fact that this lab computer has never had direct access to this storage device.

In some embodiments, the facility does not rely on the storage of any information on the storage device in connection with a data completion operation. In some such embodiments, each time a storage device is inserted in or directly communicate to the reader, the reader checks one or more completion servers for completion data stored on behalf of the storage device. In some embodiments, only a single completion server is used, and only that completion server is accessed by the reader. In some embodiments, where multiple completion servers are used, a shared mechanism is used for mapping from information about the patient—such as patient identifier—to the identity of the server on which the completion information is to be stored and from which the reader is to retrieve the completion information. In a case where is not possible to perform such a mapping, in some embodiments, the facility exhaustively checks each available completion server. When accessing a particular completion server without a pointer to the completion data to be retrieved, the facility searches among the completion data stored on the completion server for any instances of such completion data that are identified as belonging to the patient, such as being tagged with the patient identifier of the patient.

In some embodiments, each patient is identified for purposes of tracking the patient's medical information by a hash of a combination of common identifying information for the user, such as name, birthdate, taxpayer identification number, etc. A public/private key pair is also typically issued to each patient, the public key of the pair being published in connection with the patient's identity, and the private key of the pair being stored securely on the patient's individual patient data storage device. In some embodiments, a patient can specify a set of parties to receive access to a specified portion of the patient's patient data. In some embodiments, this information is represented by encrypting with the patient's private key (1) information identifying the portion of authorized data, and (2) the public keys of the authorized parties. In some embodiments, this encrypted information is stored in a Block Chain-based distributed database. In some embodiments, access is provided to this authorized data by (1) encrypting the data with a single-use symmetric key; (2) attaching to the encrypted version of the data, for each authorized party, and instance of the single-use key encrypted with the authorized party's public key; (3) and storing this information on a server, such as a record-completion server, together with the patient's patient identifier. Any of the authorized parties can access this data based upon the patient's patient identifier, and use its private key to decrypt the instance of the single-use key that was encrypted with its public key. The party then uses the decrypted instance of the single-use key to decrypt the patient data encrypted with the single-use key.

In some embodiments, each time a new entity is granted access to information about a patient (such as by a patient), the facility generates a new certificate having its own public and private keys. The facility encrypts the private key with the public key of the entity receiving access. In an access list that is in some embodiments publicly available, the facility stores the generated public key of the pair together with the private key of the pair that is been encrypted with the public key of the entity receiving access. Here, a person having access to this access list is unable to determine which entity was given access, since the public key of the entity receiving access cannot be discerned from its use to encrypt the generated private key of the pair. In some embodiments, the facility adds to the access list dummy items, none of which correspond to an entity actually receiving access. In some embodiments, the facility periodically alters the keys in the access list for increased security.

In some embodiments, the facility uses a symmetric key, such as an Advanced Encryption Standard ("AES") key to encrypt encrypted with a published public key, and stored with the document (or in separate storage) together with encrypted private key. This provides no information about the entity that has access to the document. In order to access the document content, and authorized entity attempts to decrypt each private key in the key list for the document using its private key.

In some embodiments, the public access list contains—in addition to the generated public key and the generated private key encrypted with the public key of the entity granted access—a "password" constituting a random number of significant length, the password encrypted with both (1) the private key of the entity receiving access and (2) a hash on the password. The facility stores the password hash together with the encrypted document. An entity requesting a patient's data establishes a secure connection with the record completion server and provides an index for the patient—such as the patient's patient ID, or a hash on the patient's patient ID—together with the password, using the entity's private key. In the record completion server the facility verifies the password hash before providing access to the patient's data on the completion server.

In some embodiments, patient data is accessed when patients insert their individual patient data storage devices into a specialized reader device at a service provider facility, such as a doctor's office. Each reader aggregates certain data across the data storage devices inserted into it, such as by counting the number of diabetes diagnoses among the patients whose cards are inserted. Each reader forwards its aggregation results to one or more collection devices in an encrypted form that the collection device can decrypt, such as a form encrypted with a public key of the aggregation device. In some cases, each reader forwards its aggregation results to each of a group of collection devices. In various embodiments, these collection devices take a variety of forms, including reader devices, other specialized devices, commodity servers, etc. In some cases, the collection devices' hardware design is tailored to securely receiving, storing, and forwarding these aggregation results, as is all of the software that executes on it. In some cases, the collection devices communicate securely to determine a consensus about the overall aggregation results received from all of the readers. One or more of the collection devices then report the consensus overall aggregation results to a server, such as an analytics server that persistently stores the information and/or performs analysis on it. In some cases, a minimum quorum percentage of the collection devices must report the consensus overall aggregation results to the server, such as a majority of the collection devices. In some cases, multiple layers of collection devices are employed to perform this collection process. In some such cases, the consensus and quorum aspects of the processor performed only in the highest layer of collection devices—that is, the layer closest to the server, and the furthest from the readers.

In some embodiments, the facility uses a variety of different approaches to exporting patient data from readers for analysis. In some such embodiments, data exported from a reader is not aggregated across the patients known to that reader. In some such embodiments, data exported from a reader is robust enough to identify per-patient correlations between events and/or other items of patient information.

In some embodiments, instead of or in addition to storing the patient's encrypted medical records on the card, the facility stores them on an Internet-connected server. While the card is inserted, the reader device can use credentials for the patient, the reader, and the provider to identify, download, and decrypt medical records of the patient stored on an Internet-connected server. When the provider creates additional medical information for the patient, the reader uses the same credentials to encrypt and upload the additional information to the server. The encrypted patient information stored on the server can be backed up to guard against its loss. The encrypted data can be accessed and decrypted using the original card issued to the patient, or a replacement card containing the same credentials—along with credentials for a reader and a provider.

Figure 16:
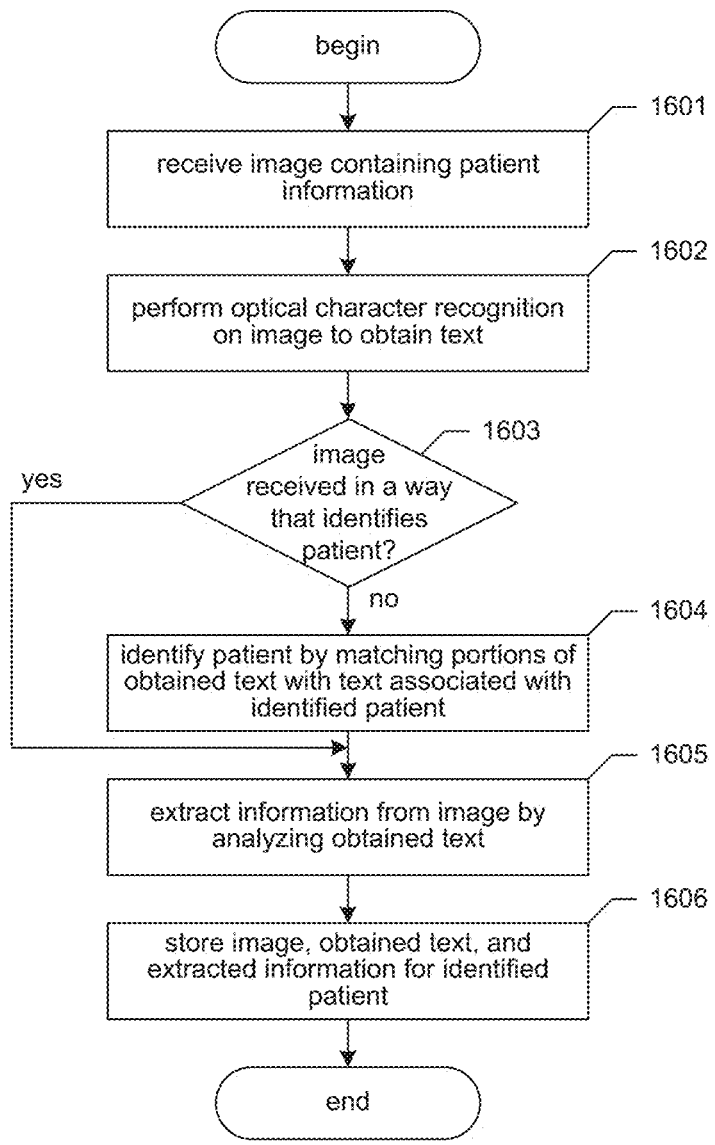
FIG. 16 is a flow diagram showing a process performed by the facility in some embodiments to add information to a patient's electronic medical record.

FIG. 16 is a flow diagram showing a process performed by the facility in some embodiments to add information to a patient's electronic medical record. In act 1601, the facility receives an image containing patient information. In various embodiments, the image is received from the patient, from a provider of medical services, from a person or a machine exporting elements of the patient's medical record from another source or electronic medical record system, etc. In various embodiments, the image is received via fax in a fax server, via email, text, or SMS, etc. In some embodiments, the image is received in a way that uniquely identifies the patient to whom it relates; examples include receiving a fax at a fax telephone number assigned to a particular patient, or from a phone number associated with a particular patient; receiving an email at an email address assigned to a particular patient, or from an email address associated with a particular patient; receiving a text message at a phone number assigned to an individual patient, or from a phone number associated with an individual patient; etc.

For example, Table 1 below shows an association maintained by the facility in some embodiments between the user identifiers of users registered with the facility and telephone numbers assigned to those user identifiers on a 1-to-1 basis.

TABLE 1

| telephone number | user identifier |
| --- | --- |
| 415-314-8873 | 1035436521 |
| 415-314-8874 | 5462156433 |
| 415-314-8875 | 7361921465 |
| 415-314-8876 | 4423508464 |

For example, for the user having user identifier 7361921465, the telephone number 415-314-8875 would be made available to providers and others wishing to add documents to the information stored by the facility on behalf of this user. This telephone number might, for example, be printed on a storage card or other insurance card carried by the person; be included in a paper or electronic medical chart for the person; be printed in the account statement for person's account; etc. When an image is received in a fax to this number or in an MMS received at this number, the facility determines in act 1603 that its receipt of the image at this phone number identifies the image as relating to the user having this user identifier.

As another example, Table 2 below shows associations established by the facility in some embodiments between the user identifiers of individual users and destination email addresses to which images and other documents may be emailed to be added to the information stored by the facility for the corresponding user.

TABLE 2

| email address | user identifier |
| --- | --- |
| acct5488975315@docroute.com | 7361921465 |
| acct5488975819@docroute.com | 5462156433 |
| acct5489851351@docroute.com | 4423508464 |
| acct6351002646@docroute.com | 1035436521 |

For example, for the same user discussed above, the user having user identifier 7361921465, someone wishing to add an image or other document to the information stored by the facility for this user would enclose it in an email message addressed to the email address acct5488975315@docroute.com. On receipt, the email server for this domain would use the mapping shown in Table 2 to identify the information transmitted in the email message as relating to the user having user identifier 7361921465.

In act 1602, the facility performs optical character recognition on the image received in act 1601 to obtain text that appears in the image. In act 1603, if the image was received in act 1601 in a way that identifies the patient to which it corresponds, then the facility continues in act 1605, else the facility continues in act 1604. In act 1604, the facility identifies the patient by matching portions of the obtained text with text that is associated with the identified patient. In various embodiments, this can be, for example, the patient's name; the patient's social security number; the patient's patient number; the patient's medical insurance policy number; the patient's address or telephone number; etc. In act 1605, the facility extracts additional relevant information from the image by analyzing the obtained text. In a variety of embodiments, this can include, for example: the nature of an image, such as a radiological scan, a textual note, lab results, a pharmacy prescription, a set of written patient orders, etc.; particular information, such as a diagnosis, a physiological metric, a date and time at which the patient was evaluated or tested, an election made by the patient about his or her care, etc. In act 1606, the facility stores the image received in act 1601, the text obtained in act 1602, and the information extracted in act 1605 for the patient that was identified. In some embodiments (not shown), the facility presents the image and associated information stored in act 1606 to a qualified person for review. In various embodiments, this reviewer verifies that the document has been associated with the correct patient and has been interpreted correctly; authorizes adding it to that patient's electronic medical record; and determines what follow-up should occur in response to this new information, such as ordering a medical test, scheduling an appointment with a specialist, etc. The facility proceeds to act in accordance with reviewer's decisions. After these acts, this process concludes.

In some embodiments, a smartphone app provides for the selective sharing of private documents. FIGS. 17-34 discussed below show one approach to performing selective sharing of private documents using a smartphone app that is used by the facility in some embodiments. The app displays a list of the user's private documents, from which the user selects one or more documents for sharing. The user asks a person with whom the user wishes to share the selected document or documents to go to a particular URL in a web browser executing on a "sharee device" with which the selected documents are to be shared. When the page is downloaded and displayed, it contains visual information uniquely identifying the browser session in which the webpage is retrieved, such as a QR code. The user uses the app to capture this visual information from the person's display, using the smartphone's camera. In response, the app handshakes with the Web server, which makes the selected documents available to view, or to download, for a brief period within the browser session. In some embodiments, the app requires authentication by the user, such as via a fingerprint scanner, via facial and/or voice recognition, via password or numerical passcode entry, etc. In some embodiments, the Web server arranges for the web browser to receive decrypted versions of the selected documents that are stored in encrypted form, in such a way that the decrypted versions are never stored in the server; are only stored in the server in small sections; or are only stored in the server for a short period of time. In some embodiments, the Web server conveys the selected documents to the web client using one or more secure transmission techniques, such as the HTTPS protocol. In some embodiments, the user can specify within the app whether the person is able to download or only view the selected documents.

In various embodiments, the facility uses the QR code or other visual information in one or both of two different ways:

1. For confirming the physical presence of the device (i.e. patient's smartphone with direct online connectivity, VYRTY reader with direct online link, etc.) which provides access to protected data and the physical proximity of such device to the sharee device (i.e. physician's computer) used for accessing such data. In this case the "code" is generated either by the server which initiates the session or by one of the devices. The second device "reads" the "code" using it's sensor (i.e. camera). The "code" in this case is a one-time password used for starting/initiating the data-transfer session.

2. As a key (symmetrical or asymmetrical) which is used by the device (smartphone, reader, etc.) that provides access to the data to encrypt the data within the current session. Then sharee device (e.g., the physician's computer) that is used to access such data can use the code to decrypt the data. Such key can be unique for each session. The key can also be digitally signed in order to ensure its ownership by a particular organization.

3. The combination of #1 and #2. In this case the "code" contains both the password and the session key.

In some embodiments, the facility's app display 1610 allows a user to navigate among documents, such as documents in the user's health record repository, such as by selecting a category of documents, then selecting individual documents from a list in that category. The app display shows the display of a particular document selected by a user. The display includes a share button that the user can activate, such as by touching it. In response, the app presents an app display that directs the user to use a web browser on a sharee device to access a particular URL. The display also identifies the document that will be shared. The facility presents a web display when a web browser on the sharee device is used to access the URL specified by the app. The web display includes a QR code that can be captured from the screen of the sharee device using the camera of the smartphone or other device on which the app is running. The app captures the QR code using the camera of the device on which the app is running, and displays a share button that the user can activate in order to confirm sharing of the identified document with the sharee device. In response, the facility makes the identified document available on the sharee device.

Figure 17:
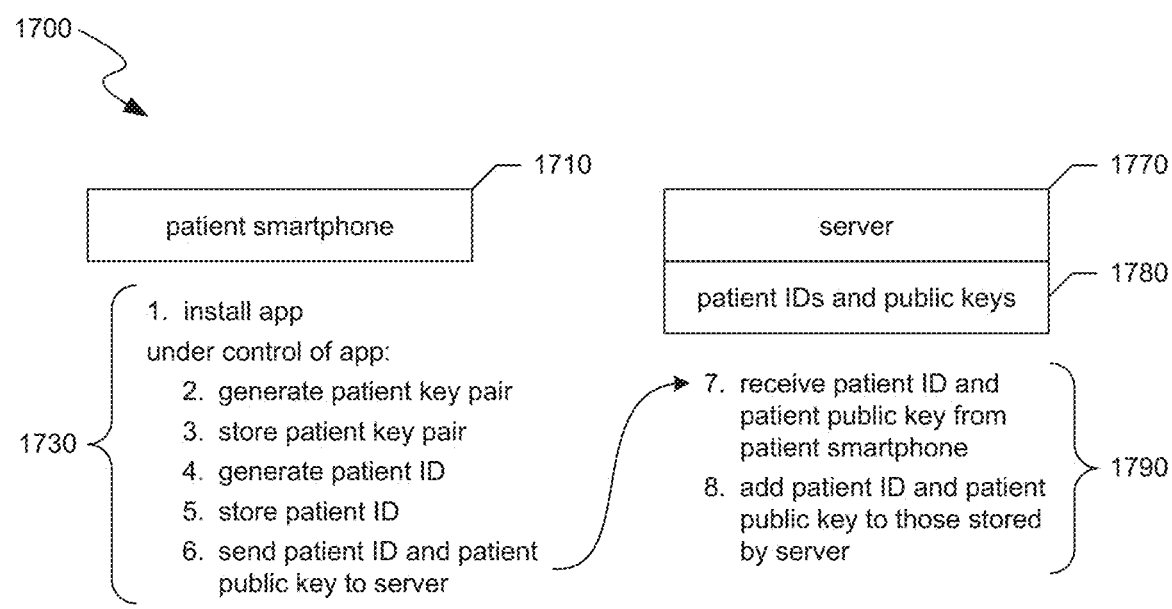
FIG. 17 is a flow diagram showing a process performed by the facility in some embodiments to initialize the use of a patient smartphone with the facility.

FIG. 17 is a flow diagram showing a process performed by the facility in some embodiments to initialize the use of a patient's smartphone with the facility. The flow diagram 1700 includes a block 1710 representing the patient smartphone, along with acts 1730 performed by the facility on the patient smartphone. The flow diagram also includes a block 1770 representing a server that operates as part of the facility; a set of patient IDs and patient public keys 1780 for patients registered with the facility that are stored on the server; and acts 1790 performed by the facility on the server. In act 1, the patient installs a specialized smartphone application ("app") that is part of the facility in some embodiments. In some embodiments, acts 2 and 3 among acts 1730, and many or all of the acts depicted in connection with the patient smartphone in the additional flow diagrams discussed below, are performed by or otherwise under the control of this app. In act 2, the facility generates a public/private key pair for the patient. In act 3, the facility stores the generated patient key pair on the patient smartphone. In act 4, the facility generates a patient ID to uniquely identify the patient to the facility. In act 5, the facility stores the generated patient ID on the patient smartphone. In act 6, the facility sends the generated patient ID and patient public key to the server. In act 7, in the server, the facility receives the patient ID and patient public key sent from the patient smartphone. In act 8, the facility adds the received patient ID and patient public key to those stored by the server. After act 8, this process concludes.

In some embodiments, the facility uses the HTTPS protocol, or other transport-level encryption technique to encrypt network traffic passed between different network nodes, such as for the data transmissions described in connection with FIG. 17 and the flowcharts that follow.

Figure 18:
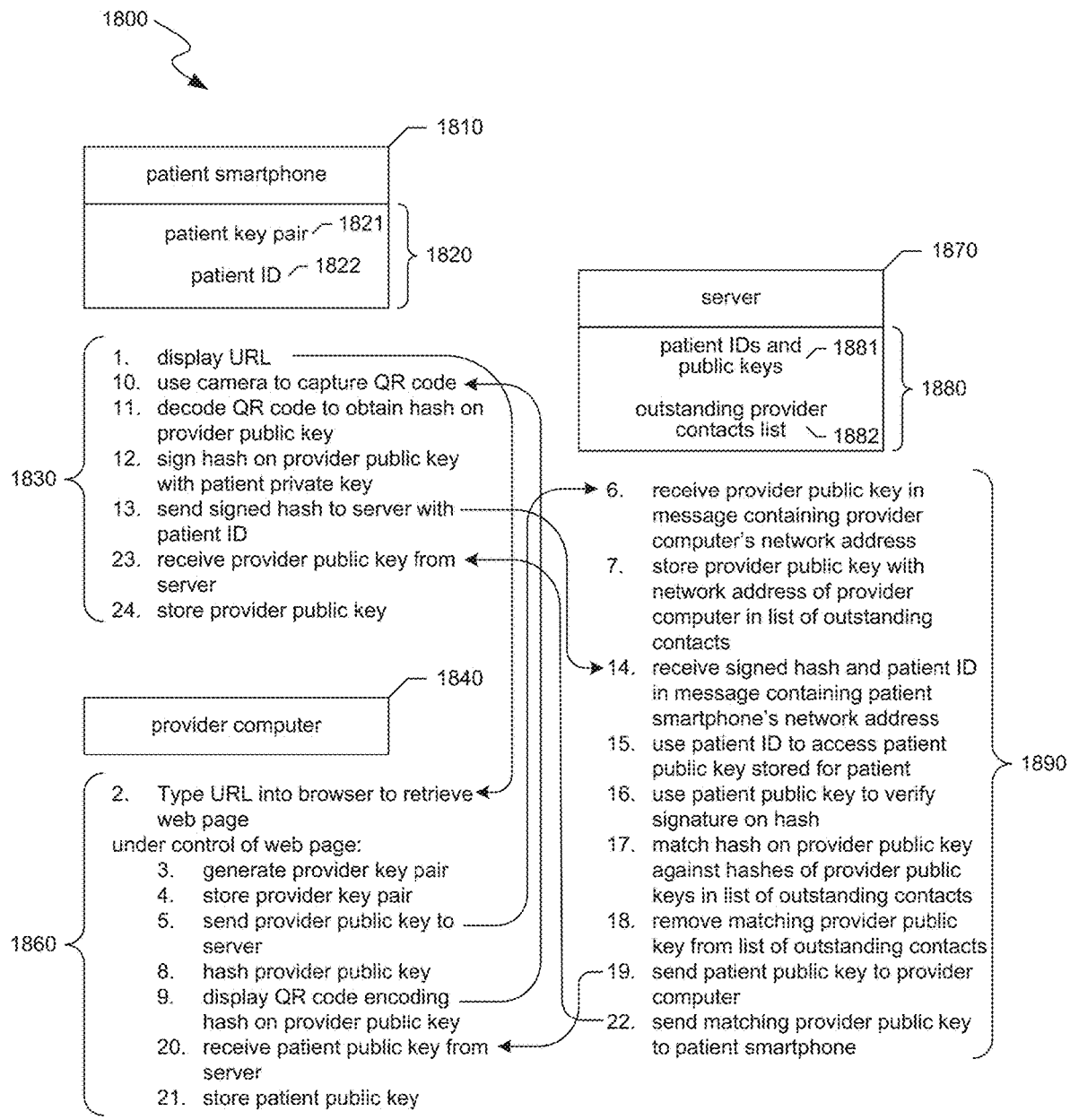
FIG. 18 is a flow diagram showing a process performed by the facility in some embodiments to connect a physician or other service provider with patient data maintained for the patient by the facility, either for reading, writing, or both.

FIG. 18 is a flow diagram showing a process performed by the facility in some embodiments to connect a physician or other service provider with patient data maintained for the patient by the facility, either for reading, writing, or both. The flow diagram 1800 includes block 1810 representing the patient smartphone, block 1840 representing a computer used by the provider, and block 1870 representing a server hosting server aspects of the facility. It can be seen that, at this point, the patient smartphone stores the patient key pair 1821 and patient ID 1822 generated and stored in acts 2-5 shown in FIG. 17. Also, stored by the server are patient IDs and public keys 1881 that include those for the present patient received and stored in acts 7 and 8 in FIG. 17.

Figure 19:
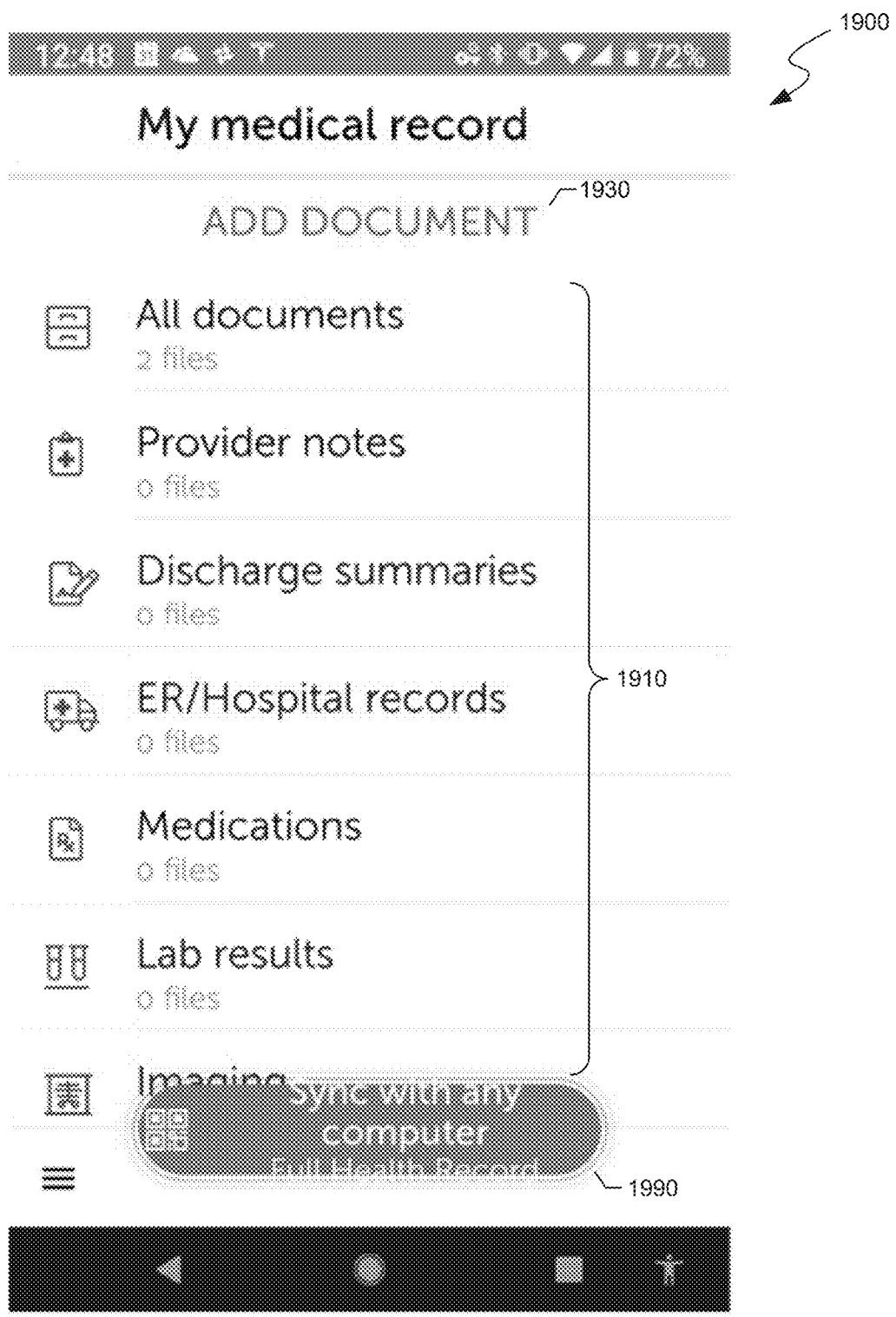
FIG. 19 is a display diagram showing a sample smartphone display presented by the facility in some embodiments to provide an overview of the data stored by the facility on behalf of a patient.
Figure 20:
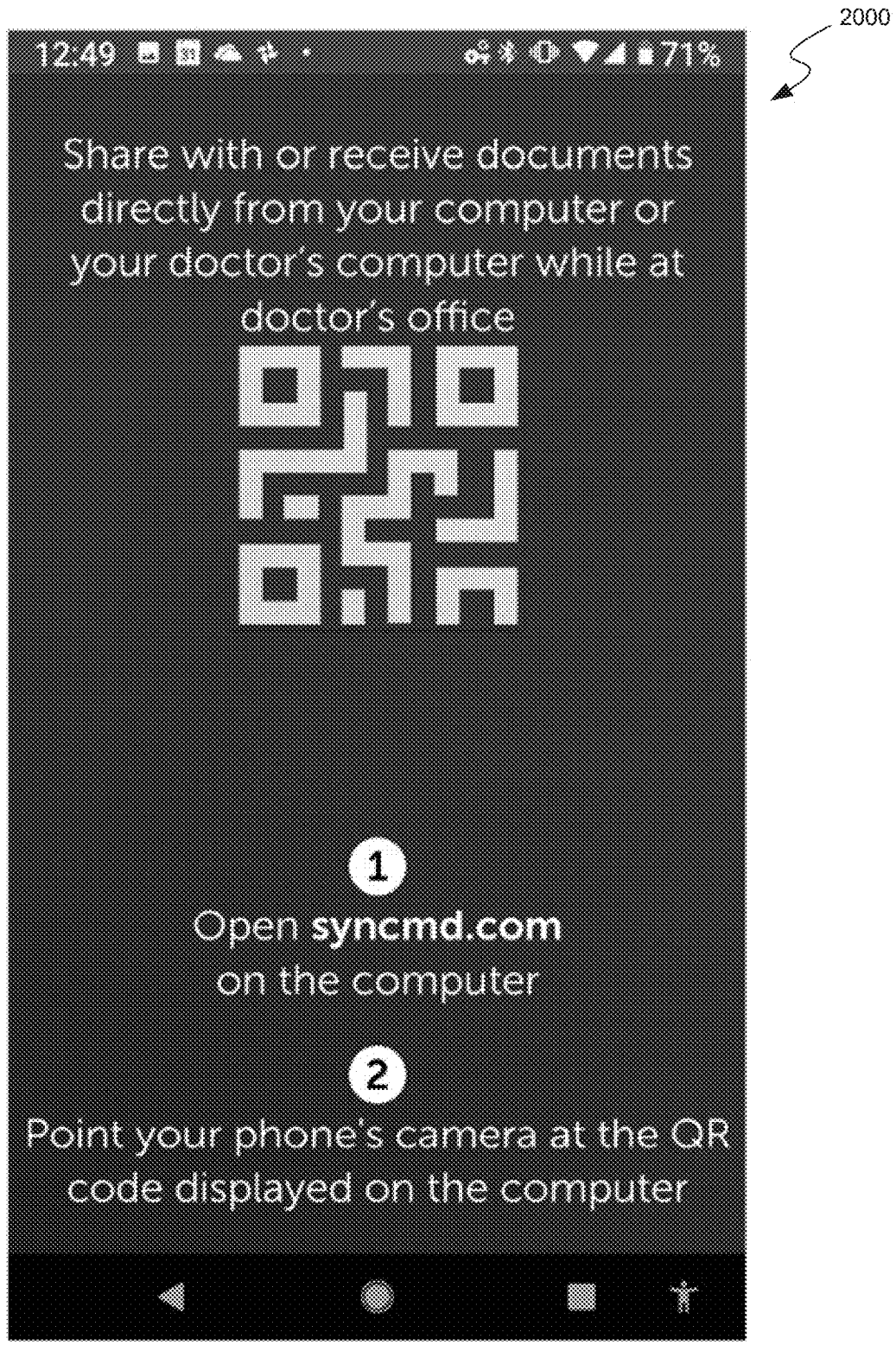
FIG. 20 is a display diagram showing a sample display presented by the facility on the patient smartphone in some embodiments when the user activates a control to synchronize their Full Health Record with a particular computer.

In act 1, the facility displays a URL on the patient smartphone for a web site associated with the facility. FIGS. 19 and 20 depict an example of displaying such a URL.

FIG. 19 is a display diagram showing a sample smartphone display presented by the facility in some embodiments to provide an overview of the data stored by the facility on behalf of a patient. It can be seen that the display 1900 includes a list 1910 of categories of documents stored by the facility for the patient, which include two files in an "All documents" category and two files (obscured) in an "Imaging" category. The user can touch one of these categories in order to display the files within it. The display also includes a control 1930 that the user can touch in order to add a new document to the information stored for the patient by the facility. The display also includes a control 1990 that the user can touch in order to synchronize their Full Health Record with any computer, such as a computer used by a provider.

FIG. 20 is a display diagram showing a sample display presented by the facility on the patient smartphone in some embodiments when the user activates a control to synchronize their Full Health Record with a particular computer. The display 2000 includes instructions to the user to navigate to the URL "syncmd.com" in a browser on the computer, then point a camera at a QR code that will be displayed on that web site.

Returning to FIG. 18, in act 2, the user of the provider computer types the URL displayed by the smartphone into a browser to retrieve a web page associated with the facility. In some embodiments, the facility performs the remaining acts shown for the provider computer here and in the later figures described below under the control of the web page retrieved in act 2, or other web pages served on behalf of the facility. In act 3, the facility generates a provider key pair. In act 4, the facility stores the provider key pair on the provider computer. In act 5, the facility sends the public key of the provider key pair generated in act 3 to the server. In act 6, on the server, the facility receives the provider public key sent by the provider computer in a message that contains a network address for the provider computer. In act 7, the facility adds the provider public key and network address of the provider computer to the list of outstanding provider contacts stored by the server. In act 8, on the provider computer, the facility performs a hash on the provider public key. In act 9, the facility displays a QR code that encodes the hash value generated in act 8.

Figure 21:
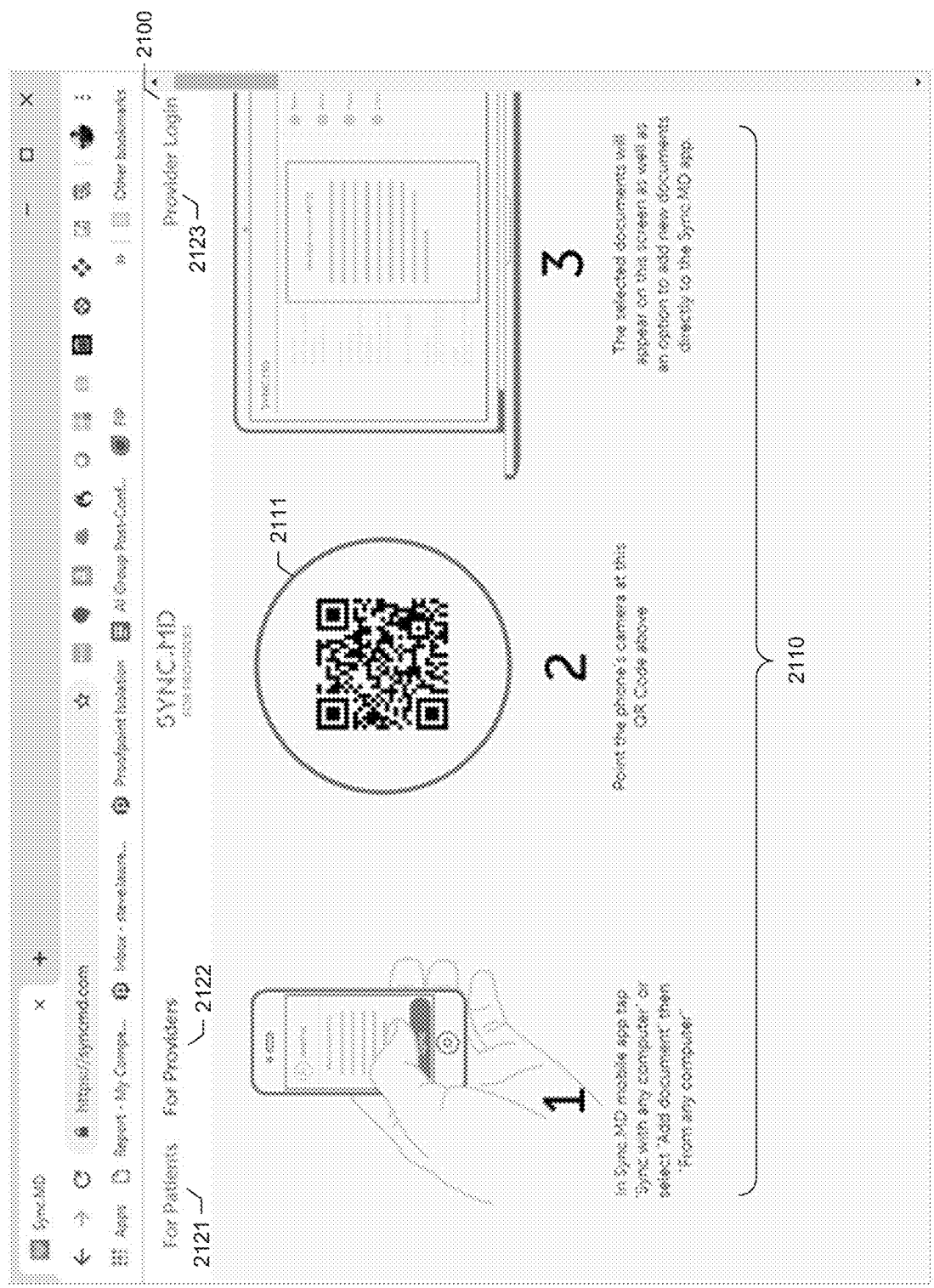
FIG. 21 is a display diagram showing a sample display presented by the facility in some embodiments on a provider's computer in which a web browser has been directed to the URL specified by the facility in the smartphone app.

FIG. 21 is a display diagram showing a sample display presented by the facility in some embodiments on a provider's computer in which a web browser has been directed to the URL specified by the facility in the smartphone app. It can be seen that the displayed web page 2100 contains a QR code 2111 at which the user of the smartphone is directed to point the smartphone's camera to capture the QR code. This is part of visual information 2110 describing the process to be performed for synchronization. The web page also includes a link 2121 to a page for patients, a link 2122 to a page for providers, and a link 2123 to a page for providers to log in.

Returning to FIG. 18, in act 10, on the patient smartphone, the patient uses the camera on the patient smartphone to capture the QR code displayed by the facility on the provider computer. In act 11, the facility decodes the QR code to obtain the hash on the provider public key that is encoded in the QR code. In act 12, the facility signs the hash on the provider public key obtained in act 11 with the patient private key stored on the patient smartphone. In act 13, the facility sends the signed hash to the server with the patient ID. In act 14, on the server, the facility receives the signed hash and patient identifier from the patient smartphone in a message that contains the patient smartphone's network address. In act 15, the facility uses the received patient ID to access the patient public key stored on the server for the patient. In act 16, the facility uses the accessed patient public key to verify the signature on the received hash. In act 17, the facility matches the hash on the provider public key received from the patient smartphone against hashes of the provider public keys that are in the list of outstanding contacts. In act 18, upon finding a matching provider public key, the facility removes it from the list of outstanding contacts. In act 19, the facility sends the patient public key received in act 14 to the provider computer. In act 20, in the provider computer, the facility receives the patient public key from the server. In act 21, the facility stores the patient public key on the provider computer. In act 22, on the server, the facility sends the matching provider public key to the patient smartphone. In act 23, in the patient smartphone, the facility receives the provider public key from the server. In act 24, the facility stores the received provider public key on the patient smartphone. After act 24, this process concludes.

In some embodiments, the facility allows providers to persistently register with the facility, awarding login credentials that facilitate ongoing access by the provider to any medical records shared with the provider by various patients. In some embodiments, the facility uses a registration process that involves entering a random code transmitted by SMS to a phone number belonging to the provider, thus tying the registration to that phone number. In some embodiments, the registration process involves elements on the provider's side of the patent/provider connection process shown in FIG. 18.

Figure 22:
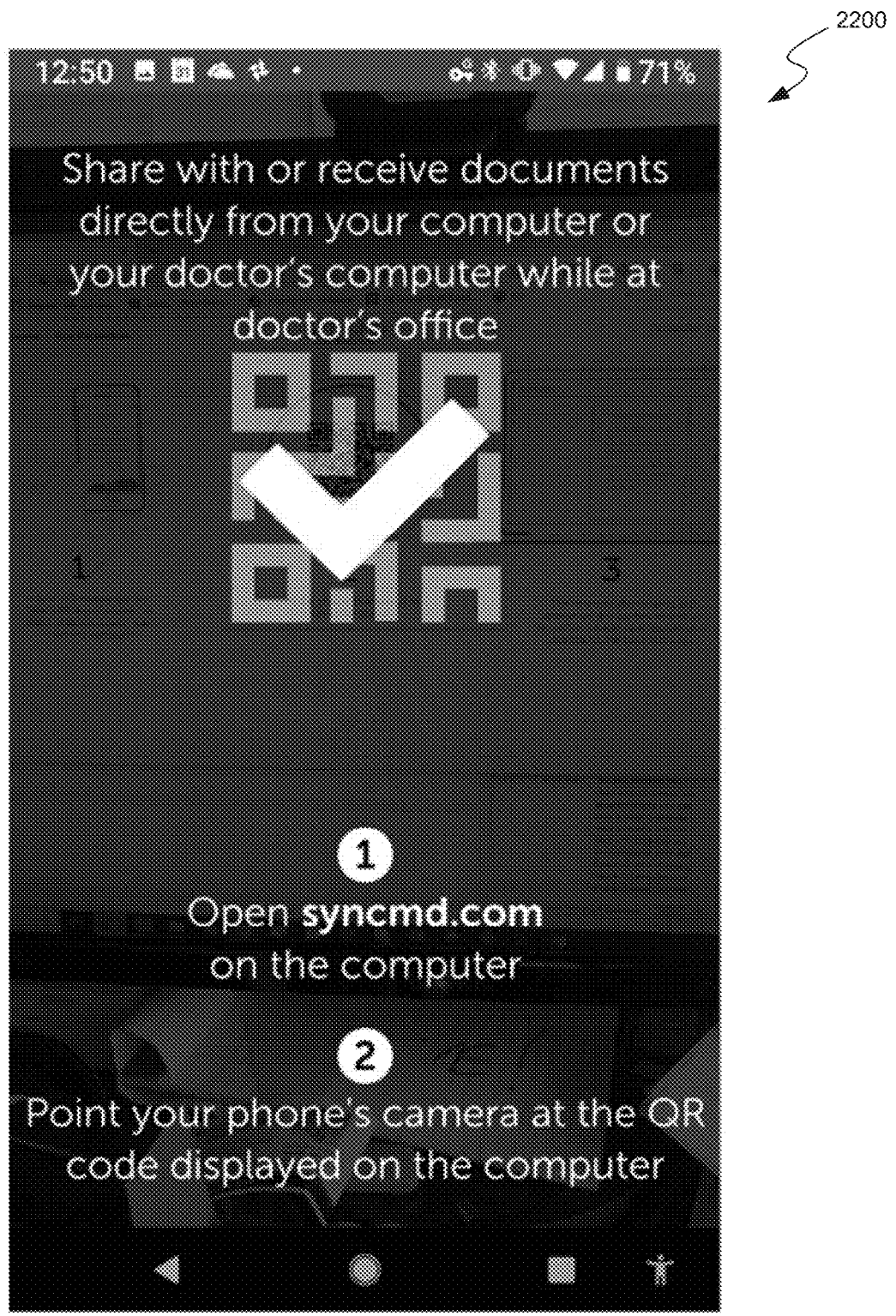
FIG. 22 is a display diagram showing a sample display presented by the facility on the smartphone acknowledging that the user has captured the QR code from the provider computer's display.

FIG. 22 is a display diagram showing a sample display presented by the facility on the smartphone acknowledging that the user has captured the QR code from the provider computer's display. In particular, the display 2000 includes a white checkmark providing this information.

Figure 23:
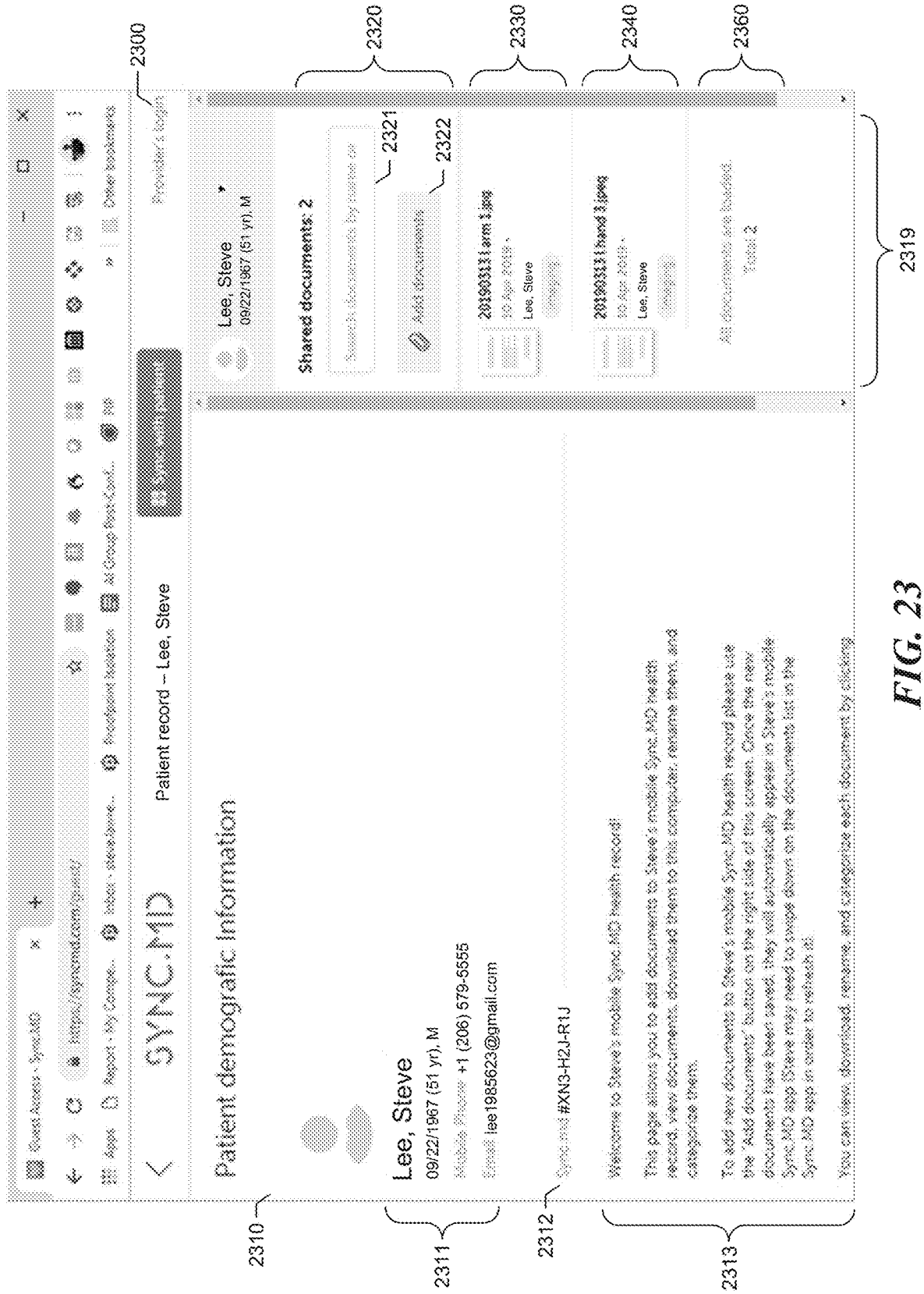
FIG. 23 is a display diagram showing a sample display presented by the facility in some embodiments on the provider computer to make available to the provider information in the patient's health record that has been shared by the patient with the provider.

FIG. 23 is a display diagram showing a sample display presented by the facility in some embodiments on the provider computer to make available to the provider information in the patient's health record that has been shared by the patient with the provider. The web page 2300 includes information about the patient, such as an image 2310, and identifying in demographic information 2311, as well as an identifier assigned to the patient by the facility. The web page also includes directions 2313 for using the patient health record. A document column 2319 contains information about the different documents available to the provider from the patient's health record. In cases such as the one depicted in the foregoing figures where the patient synchronizes the Full Health Record with the provider, the provider is able to access all of the documents stored for the patient by the facility. In other cases, where the patient authorizes the sharing of only a proper subset of these documents, only these are visible in column 2319 to the provider. Here, representative of the patient's Full Health Record, section 2320 shows that there are two documents available; contains a search field 2321 for searching for documents containing or connected to particular text; and a button 2322 that can be activated by the provider to add documents to the health record. Additionally, in some embodiments, documents can be dragged and dropped on column 2319 by the provider in order to add them to the patient's health record. Section 2330 contains information about a first document that is an x-ray image of the patient's arm, and section 2340 contains information about a second document that is an x-ray image of the patient's hand.

Figure 24:
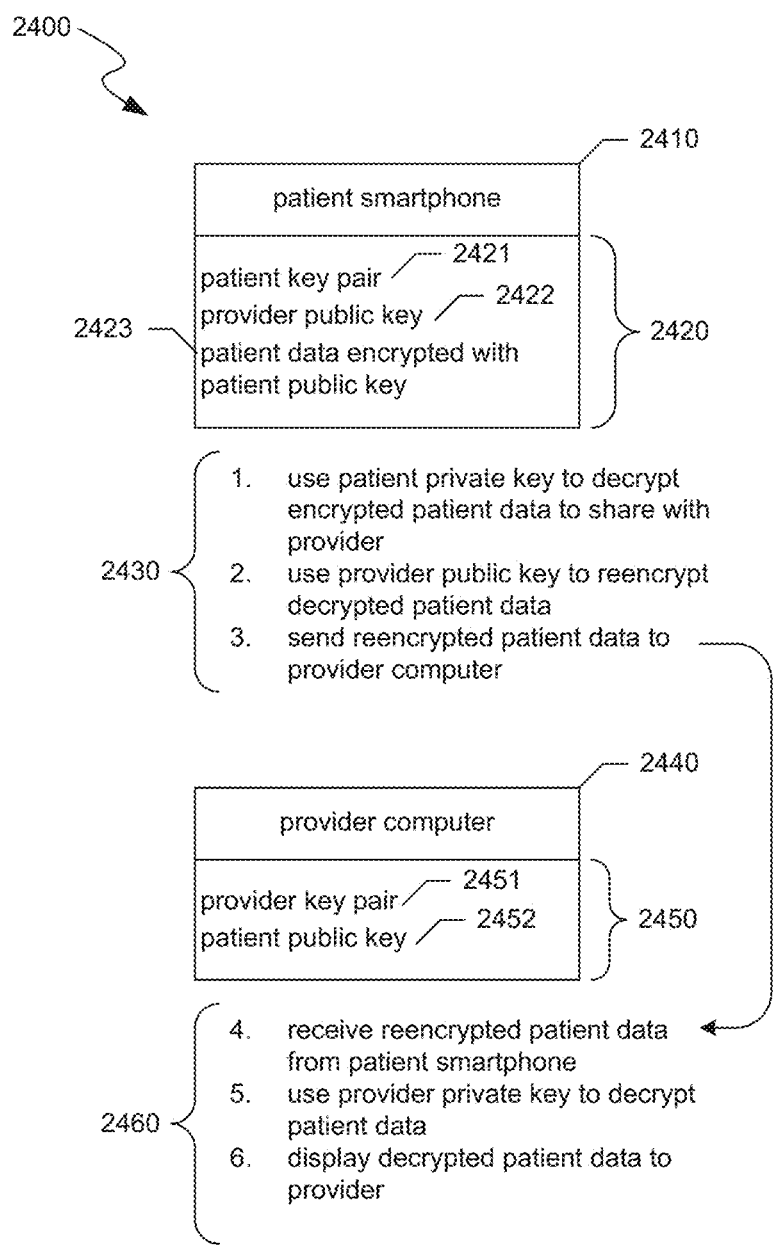
FIG. 24 is a flow diagram showing a process performed by the facility in some embodiments to display contents of the patient health record shared with the provider to the provider.

FIG. 24 is a flow diagram showing a process performed by the facility in some embodiments to display contents of the patient health record shared with the provider to the provider. The process 2400 shown in FIG. 24 follows those shown in FIGS. 17 and 18 discussed above. It can be seen that, at this point, the patient smartphone 2410 stores the following information 2420: the patient key pair 2421, the provider public key 2422, and patient data encrypted with the patient public key 2423. The provider computer 2400 stores the following information 2450: the provider key pair 2451, and the patient public key 2452. The acts 2430 performed by the facility on the patient smartphone are shown, as are the acts 2460 performed by the facility on the provider computer. On the patient smartphone, in act 1, the facility uses the patient private key stored on the patient smartphone to decrypt encrypted patient data 2423 to share with the provider. In some embodiments, this is the intersection of patient data to which the patient has authorized the provider and patient data requested by the provider, such as via the web page. In act 2, the facility uses the provider public key stored on the patient smartphone to reencrypt the patient data decrypted in act 1. In act 3, the facility sends this reencrypted patient data to the provider computer. In act 4, on the provider computer, the facility receives the reencrypted patient data from the patient smartphone. In act 5, the facility uses the provider private key stored on the provider computer to decrypt the received patient data. In act 6, the facility displays the decrypted patient data to the provider. After act 6, this process ends, or is repeated for additional patient data.

In various embodiments, the facility provides access to patient data to be provided in a variety of ways other than decrypting the data using the patient private key, then re-encrypting the data using the provider public key as shown. For example, where the facility encrypts each piece of patient data with a different single-use symmetric key as discussed above, the facility maintains the encryption of the patient data using this symmetric key, and (1) uses the patient private key to decrypt a version of this symmetric key encrypted with the patient public key, then (2) re-encrypts the decrypted symmetric key with the provider's public key. The provider may then (1) retrieve the patient data, encrypted with the single-use symmetric key, and the copy of the symmetric key encrypted with the provider's public key; (2) decrypt the symmetric key using the provider private key; and (3) decrypt the patient data using the decrypted single-use symmetric key.

Figure 25:
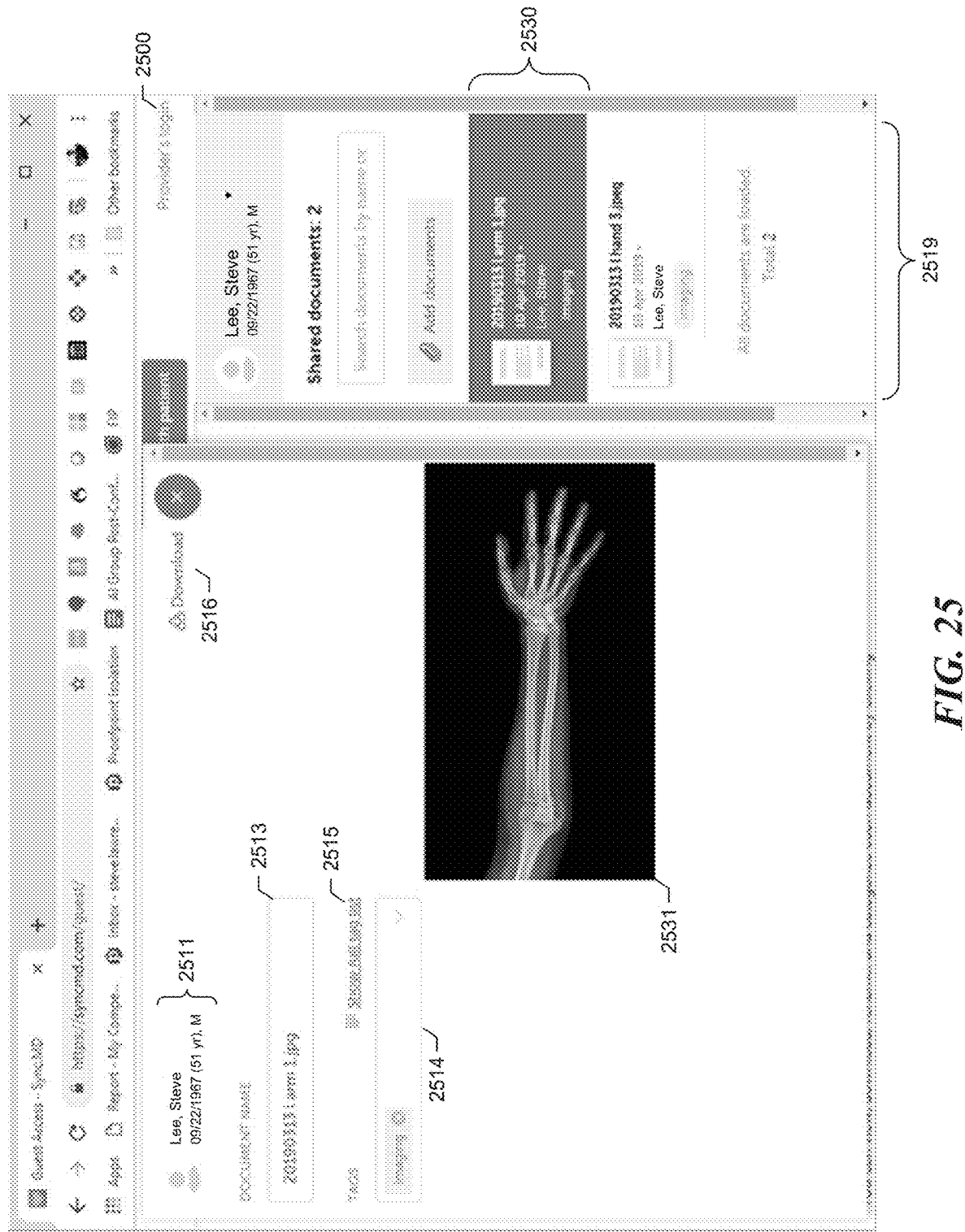
FIG. 25 is a display diagram showing a sample display presented by the facility on the provider computer in some embodiments to present to the provider information from the patient health record.

FIG. 25 is a display diagram showing a sample display presented by the facility on the provider computer in some embodiments to present to the provider information from the patient health record. For example, when the user of the provider computer clicks or taps on section 2530 corresponding to the arm x-ray image, the facility displays a pane including the document contents as well as associated information. The pane includes the x-ray image 2531 that is contained by the selected document; information 2511 identifying the patient; a name 2513 of the document; a list 2514 of tags that have been attributed to the document; a control 2515 that the user can activate in order to show a list of all possible tags that may apply to the document, and a control 2516 for downloading a copy of the document to the provider computer for future access. In some embodiments, the user of the provider computer system controls 2513-2515 to edit the name of the document and the tags attributed to it.

Figure 26:
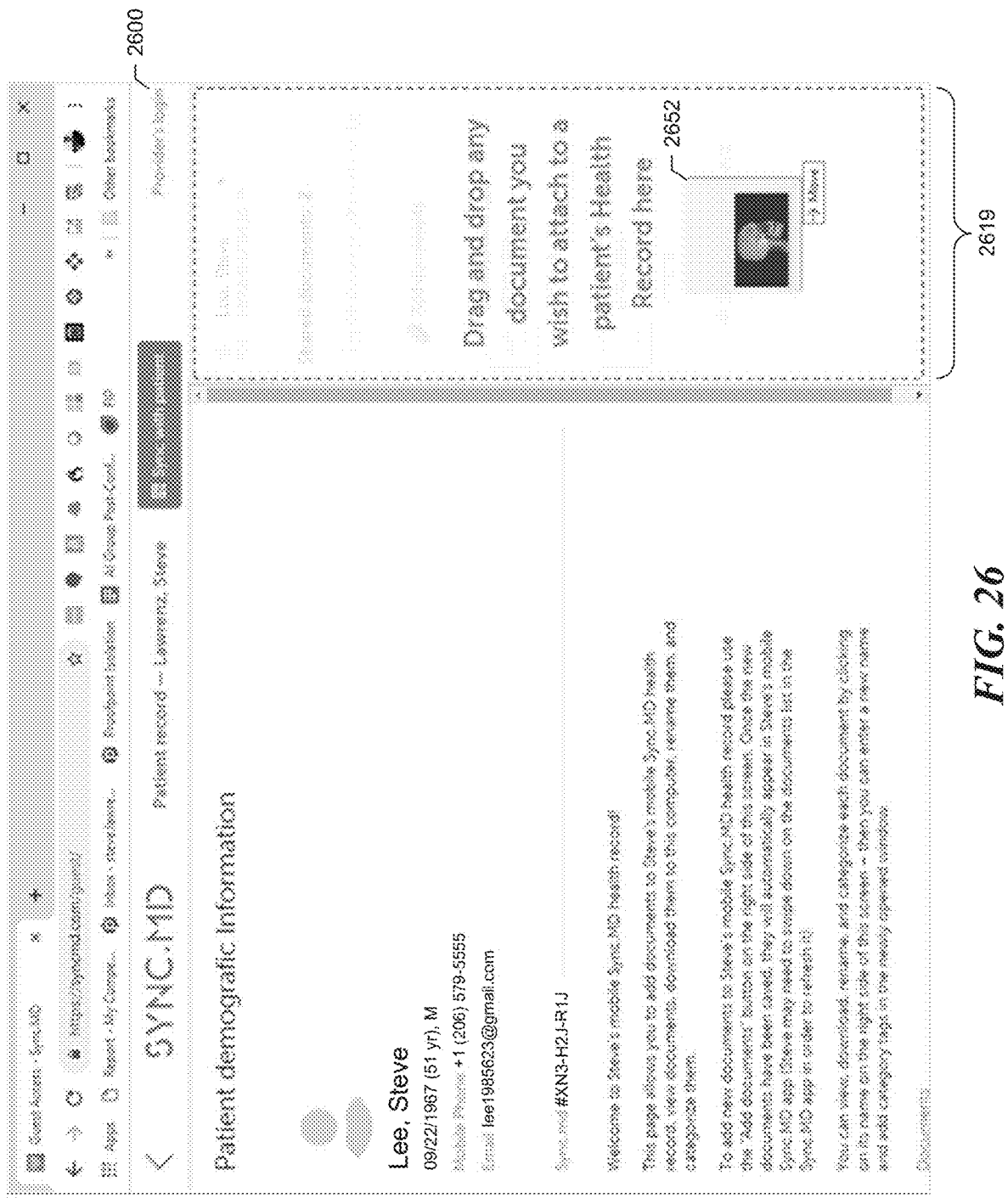
FIG. 26 is a display diagram showing a sample display presented by the facility on the provider computer in some embodiments to enable the user of the provider computer system to add a new document to the patient's medical record.

FIG. 26 is a display diagram showing a sample display presented by the facility on the provider computer in some embodiments to enable the user of the provider computer system to add a new document to the patient's medical record. It can be seen that, in the web page 2600, the user has dragged a new document 2652 containing a skull x-ray image from the file system of the provider computer system into column 2619 representing the patient health record. A message there shows that this will result in the document being added to the patient health record.

Figure 27:
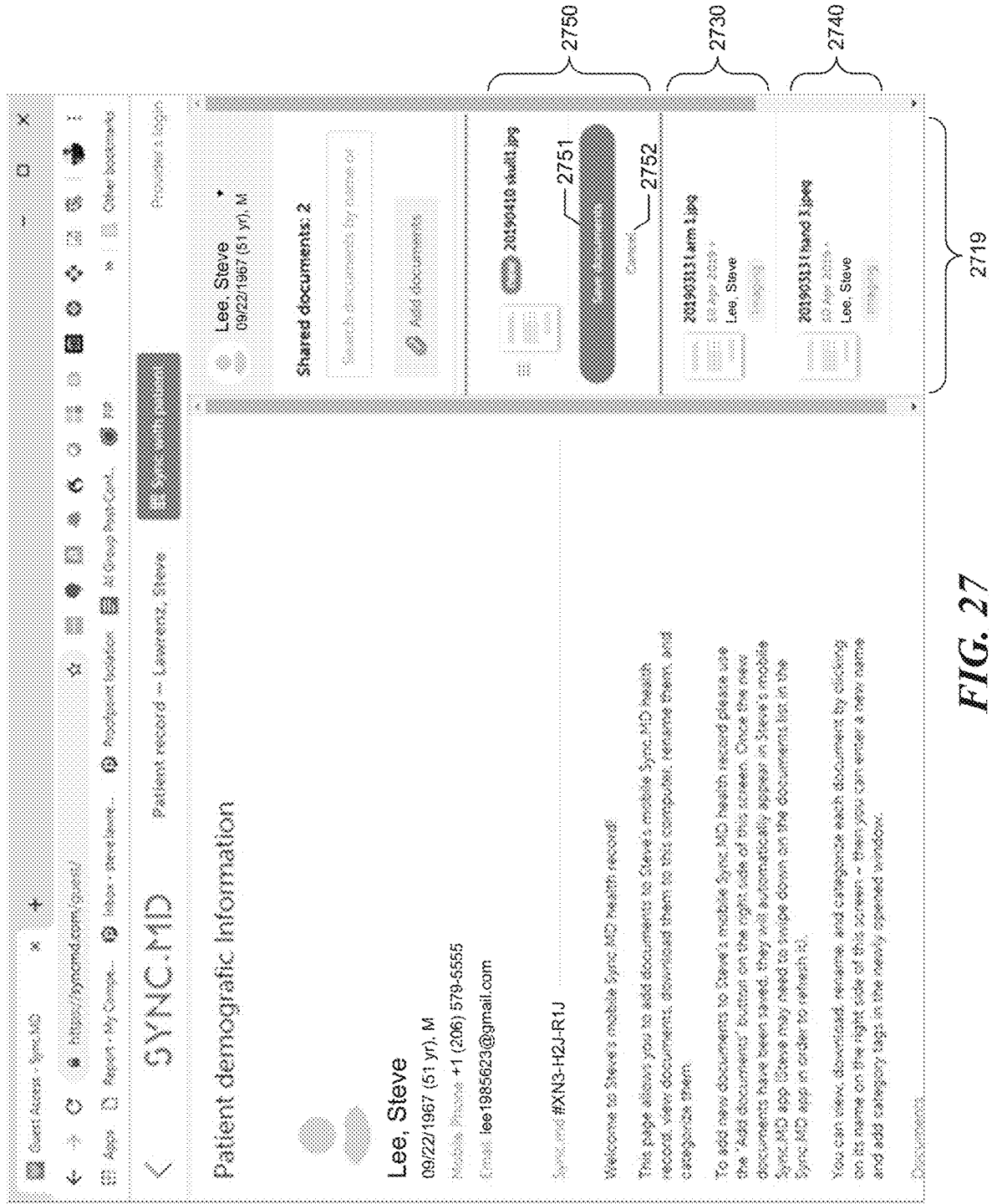
FIG. 27 is a display diagram showing a sample display presented by the facility on the provider computer in some embodiments to acknowledge a request by the user of the provider computer to add a document to the patient health record.

FIG. 27 is a display diagram showing a sample display presented by the facility on the provider computer in some embodiments to acknowledge a request by the user of the provider computer to add a document to the patient health record. It can be seen that a new entry 2750 has been added to column 2719 representing the patient health record. The new section identifies the document that was dragged and dropped by the user, includes a "new" indication indicating that the document can now be added to the patient health record, and contains controls 2751 for saving the document in the patient health record, and control 2752 for canceling this addition.

Figure 28:
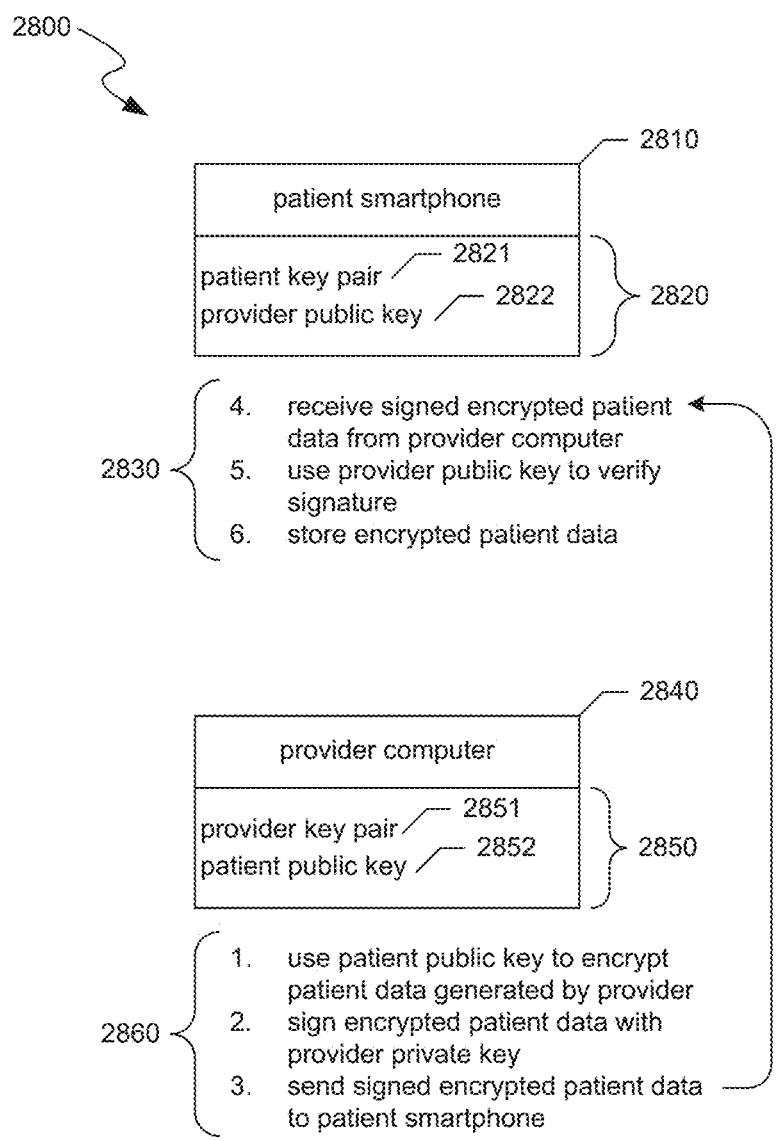
FIG. 28 is a flow diagram showing a process performed by the facility in some embodiments to store new information provided by the provider in the patient health record.

FIG. 28 is a flow diagram showing a process performed by the facility in some embodiments to store new information provided by the provider in the patient health record, such as when the user of the provider computer activates document save control 2751 shown in FIG. 27. This process 2800 follows those shown in FIGS. 17 and 18. It can be seen that, at this point, the patient smartphone 2810 includes the patient key pair 2821 and the provider public key 2822, while the provider computer 2840 stores the provider key pair 2851 and the patient public key 2852. In act 1, on the provider computer, the facility uses the patient public key stored by the provider computer to encrypt patient data generated by the provider, such as the skull x-ray image document dragged and dropped by the provider. In act 2, the facility signs the encrypted patient data with the provider private key. In act 3, the facility sends the encrypted patient data created in act 1 and signed in act 2 to the patient smartphone. In act 4, on the patient smartphone, the facility receives the signed, encrypted patient data from the provider computer. In act 5, the facility uses the provider public key stored by the patient smartphone to verify the signature. In act 6, the facility stores the encrypted patient data in the patient medical record, which may be on the patient smartphone, on a server, or both. After act 6, this process completes, or is repeated to store additional data in the patient records.

Figure 29:
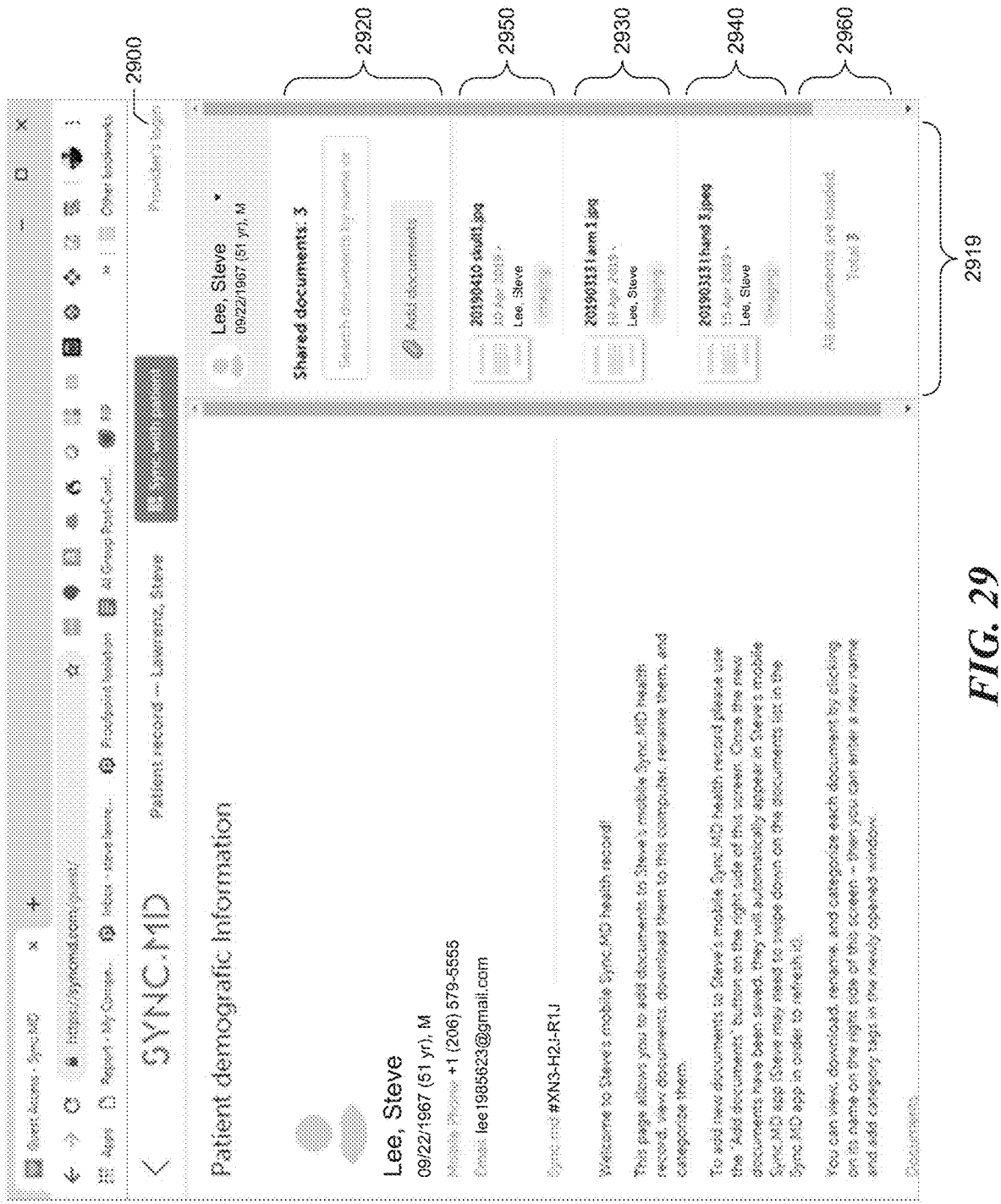
FIG. 29 is a display diagram showing a sample display presented by the facility on the provider computer in some embodiments to reflect the addition of new information to the patient medical record by the provider.

FIG. 29 is a display diagram showing a sample display presented by the facility on the provider computer in some embodiments to reflect the addition of new information to the patient medical record by the provider. Comparing web page 2900 shown in FIG. 29 to web page 2500 shown in FIG. 25, it can be seen that section 2950, corresponding to the skull image x-ray document, has been added to column 2919 representing the patient health record. Also, the summary section 2920 reflects that the patient health record now contains three documents rather than two.

Figure 30:
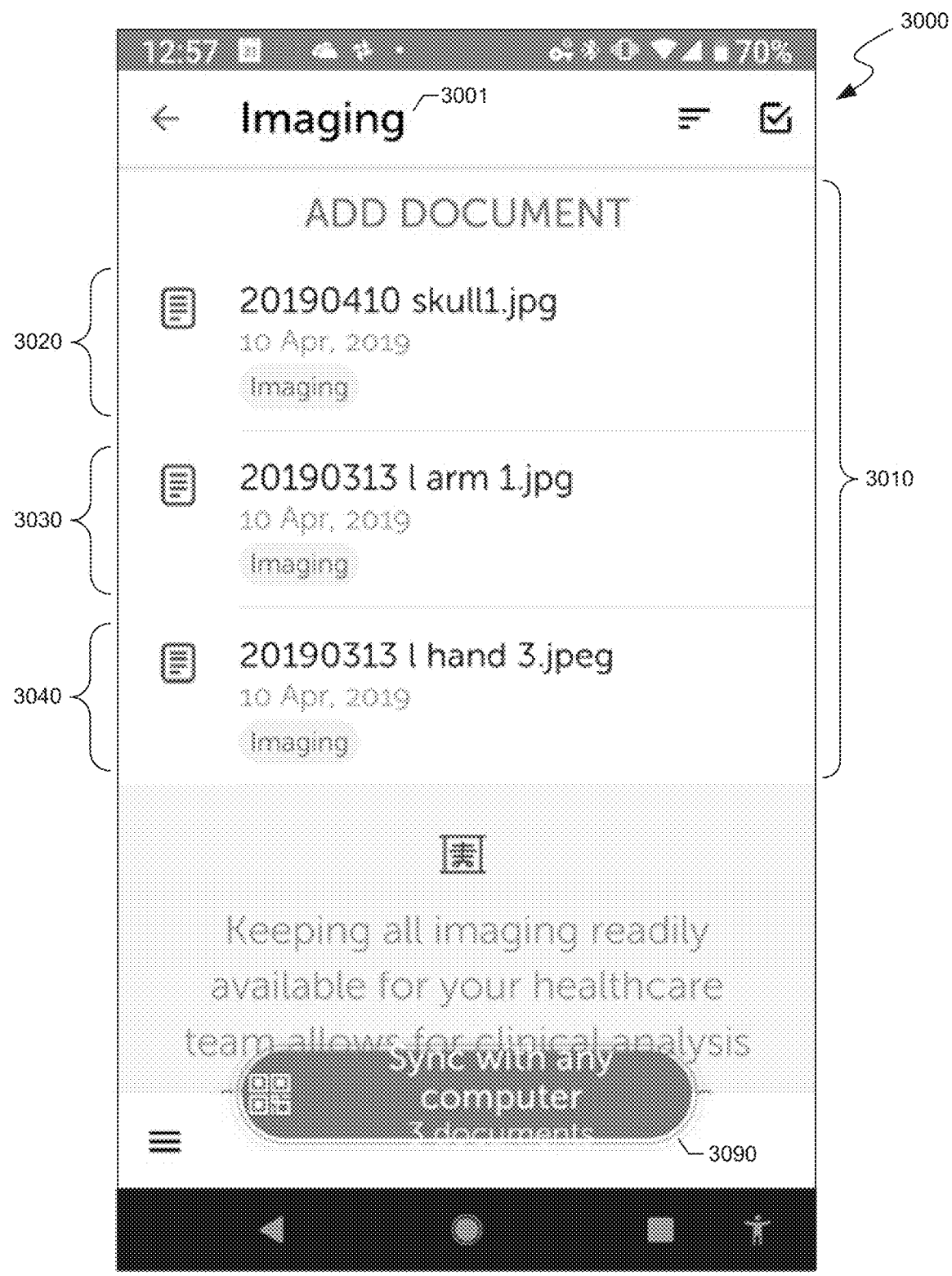
FIG. 30 is a display diagram showing a sample display presented by the facility on the patient smartphone to reflect the addition of information to the patient health record by the provider.

FIG. 30 is a display diagram showing a sample display presented by the facility on the patient smartphone to reflect the addition of information to the patient health record by the provider. It can be seen from section 3020 of display 3000 that the skull x-ray image document has been added to the patient health record. The display further includes an indication 3001 that this is a list of documents having the "Imaging" tag. The display further includes a control 3090 that the user can activate in order to synchronize any computer with just these three documents, to the exclusion of all the other documents in the patient health record. The user may also touch any of the three sections 3020, 3030, and 3040 to display the contents of any of these documents in their patient health record.

Figure 31:
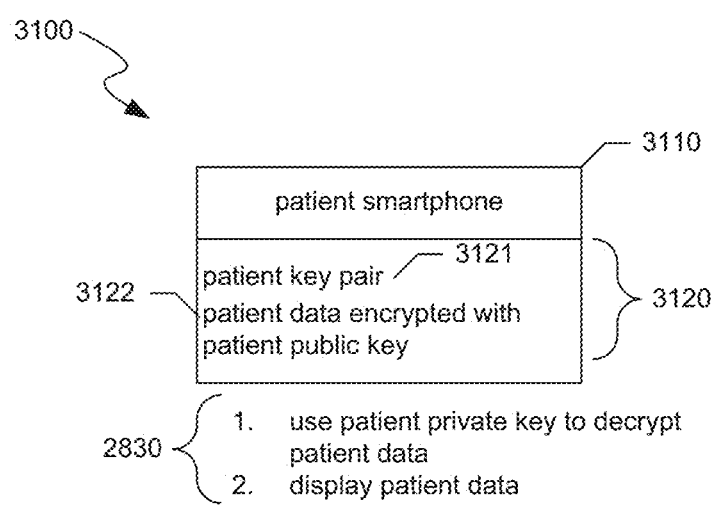
FIG. 31 is a flow diagram showing a process performed by the facility in some embodiments in order to display, on the patient smartphone, information from the patient health record.

FIG. 31 is a flow diagram showing a process performed by the facility in some embodiments in order to display on the patient smartphone information from the patient health record, such as in response to touching section 3040 shown in FIG. 30. In the patient smartphone 3110 is stored the patient key pair 3121, and patient data encrypted with the patient public key 3122. In act 1, on the patient smartphone, the facility uses the patient private key stored by the patient smartphone to decrypt at least a portion of the patient data stored by the patient smartphone. In act 2, the facility displays the patient data decrypted in act 1. After act 2, this process completes, or is repeated for other patient data in the patient health record.

Figure 32:
FIG. 32 is a display diagram showing a sample display presented by the facility to present the contents of a document in the patient health record on the patient smartphone.

FIG. 32 is a display diagram showing a sample display presented by the facility to present the contents of a document in the patient health record on the patient smartphone. It can be seen that the display 3200 contains the contents 3205 of the document—here, a hand x-ray image—along with its name 3201, a control 3202 for editing the contents of the document, a sharing control 3203 for sharing the document with others using any of a variety of other smartphone apps, and a delete control 3204 for removing the document from the patient health record. The display also includes a control 3290 that the user can activate in order to provide access to only this document to a provider computer.

Figure 33:
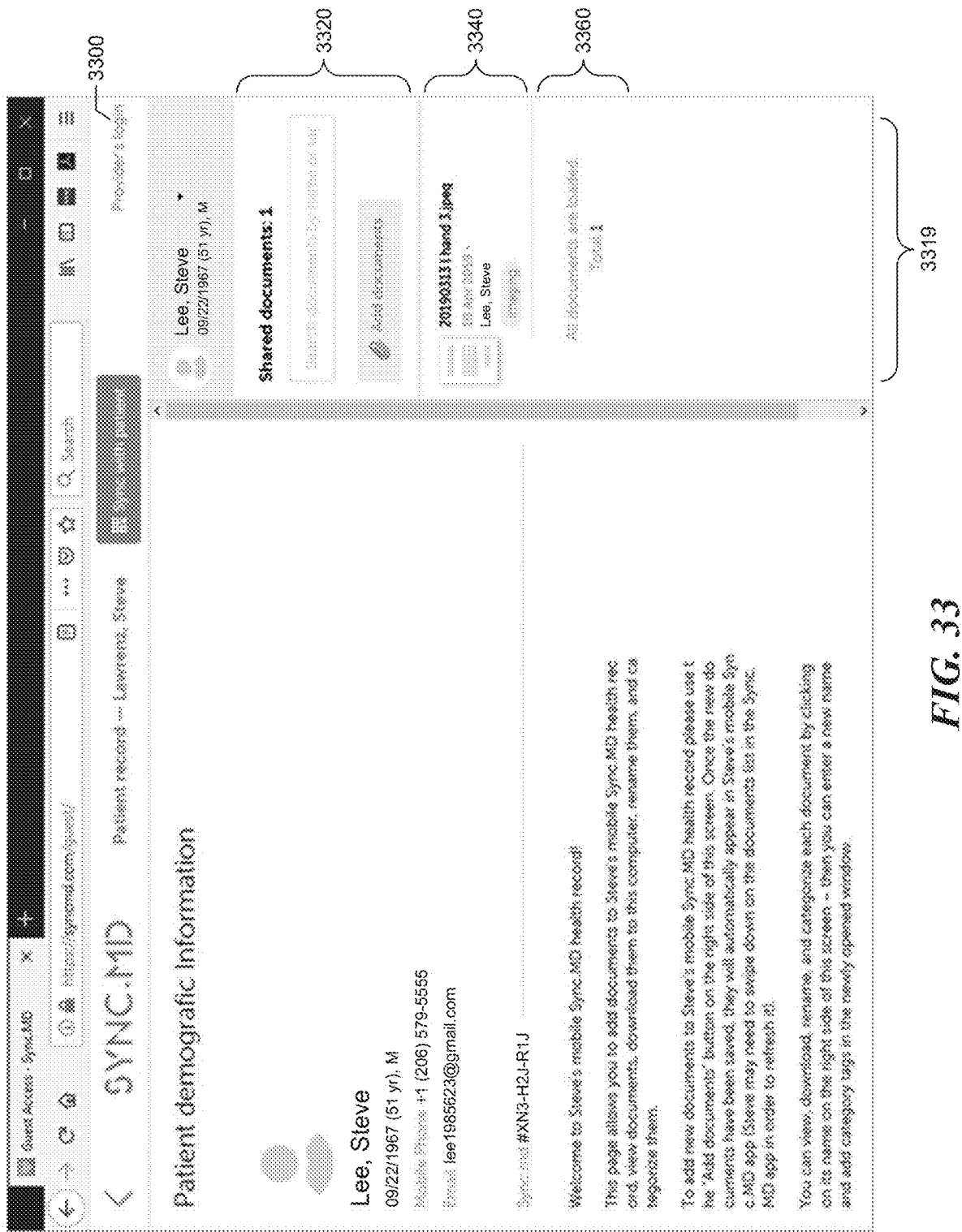
FIG. 33 is a display diagram showing a sample display presented by the facility on the provider computer in some embodiments in which a provider is authorized to access only a single document in the patient health record.

FIG. 33 is a display diagram showing a sample display presented by the facility on the provider computer in some embodiments where a provider is authorized to access only a single document in the patient health record, such as by touching section 3290 shown in FIG. 32. It can be seen in web page 3300 that column 3319 corresponding to the contents of the patient health record contains only a single document, the hand x-ray image, indicated by section 3340. It can also be seen that the count of available documents shown in section 3320 is only one.

Figure 34:
FIG. 34 is a display diagram showing sample contents of a display presented by the facility on the provider computer in some embodiments to present contents of the single patient health record document to which the provider is authorized.

FIG. 34 is a display diagram showing sample contents of a display presented on the provider computer by the facility in some embodiments to present contents of the single patient health record document to which the provider is authorized. By clicking on or tapping section 3440 corresponding to the hand x-ray image document, the user of the provider computer has caused display of a pane including the document contents 3441, as well as associated information.

It will be appreciated by those skilled in the art that the above-described facility may be straightforwardly adapted or extended in various ways.

We claim:

1. A method in a computing system for sharing secure documents, comprising:
in a mobile app executing on a mobile device:
enabling a user to select at least one secure document;
by a server:
receiving from a distinguished device an HTTP request specifying a distinguished URL, the distinguished device being different from both the mobile device and the server;
responding to the received HTTP request with a webpage containing visual information encoding a value; and
by the mobile app:
capturing an image of the visual information as rendered in the webpage;
decoding the value from the captured image of the visual information; and
using the decoded value to cause the documents selected by the user to be shared with the distinguished device that is different from the mobile device.

2. The method of claim 1 wherein the causing uses the decoded value as a session identifier for sharing the selected documents.

3. The method of claim 1 wherein the causing uses the decoded value as an encryption key for sharing the selected documents.

4. The method of claim 1 wherein the causing uses the decoded value as a session identifier and as an encryption key for sharing the selected documents.

5. The method of claim 1 wherein the visual information encoding the value is a non-human-readable symbol.

6. The method of claim 1 wherein the visual information encoding the value is a QR code.

7. The method of claim 1 wherein the value encoded by the visual information is a hash on the public key of a key pair generated for the distinguished device.

8. The method of claim 7, further comprising:
by the mobile app:
sending the decoded value to the server;
by the server:
receiving the decoded value from the mobile app;
receiving the public key of the key pair generated for the distinguished device;
hashing the received public key to obtain a hashed value;
matching the obtained hashed value to the received decoded value; and
sending to the mobile app the public key of the key pair generated for the distinguished device.

9. The method of claim 8, further comprising:
by the mobile app:
receiving the public key of the key pair generated for the distinguished device;
using the received public key to encrypt the selected at least one secure document; and
sending the encrypted using the received public key to encrypt the selected at least one secure document to the distinguished device for decryption using the private key of the key pair generated for the distinguished device.

10. The method of claim 1, further comprising, after causing the document selected by the user to be shared with the distinguished device:
receiving a file from the distinguished device; and
causing the received file to be stored as a secure document on behalf of the user.

11. One or more instances of computer-readable media not constituting transitory propagating signals per se, collectively having contents configured to cause a computing system to perform a method for sharing secure documents, the method comprising:
in a mobile app executing on a mobile device:
enabling a user to select at least one secure document;
by a server:
receiving from a distinguished device an HTTP request specifying a distinguished URL, the distinguished device being different from both the mobile device and the server;
responding to the received HTTP request with a webpage containing visual information encoding a value;
by the mobile app:
capturing an image of the visual information as rendered in the webpage;
decoding the value from the captured image of the visual information; and
using the decoded value to cause the documents selected by the user to be shared with the distinguished device that is different from the mobile device.

12. One or more instances of computer-readable media not constituting transitory propagating signals per se, collectively having contents configured to cause a mobile device to perform a method for sharing secure documents, the method comprising:
enabling a user to select at least one secure document;
capturing an image of visual information rendered in a webpage by a distinguished device other than the mobile device, the visual information encoding a value, the webpage having been received by the distinguished device in response to an HTTP request sent by the device specifying a distinguished URL;
decoding the value from the captured image of the visual information; and
using the decoded value to cause the documents selected by the user to be shared with the distinguished device that is different from the mobile device.

13. The one or more instances of computer-readable media of claim 12 wherein the causing uses the decoded value as a session identifier for sharing the selected documents.

14. The one or more instances of computer-readable media of claim 12 wherein the causing uses the decoded value as an encryption key for sharing the selected documents.

15. The one or more instances of computer-readable media of claim 12 wherein the causing uses the decoded value as a session identifier and as an encryption key for sharing the selected documents.

16. The one or more instances of computer-readable media of claim 12 wherein the visual information encoding the value is a non-human-readable symbol.

17. The one or more instances of computer-readable media of claim 12 wherein the visual information encoding the value is a QR code.

18. The one or more instances of computer-readable media of claim 12 wherein the value encoded by the visual information is a hash on the public key of a key pair generated for the distinguished device.

19. The one or more instances of computer-readable media of claim 18, the method further comprising:
sending the decoded value to a server to enable the server to:
receive the public key of the key pair generated for the distinguished device;
hash the received public key to obtain a hashed value;
match the obtained hashed value to the received decoded value; and
send to the mobile device the public key of the key pair generated for the distinguished device.

20. The one or more instances of computer-readable media of claim 19, the method further comprising:
receiving the public key of the key pair generated for the distinguished device;
using the received public key to encrypt the selected at least one secure document; and
sending the encrypted using the received public key to encrypt the selected at least one secure document to the distinguished device for decryption using the private key of the key pair generated for the distinguished device.

21. The one or more instances of computer-readable media of claim 12, the method further comprising, after causing the document selected by the user to be shared with the distinguished device:
receiving a file from the distinguished device; and
causing the received file to be stored as a secure document on behalf of the user.

22. A method in a mobile device for sharing secure documents, comprising:
- capturing an image of visual information rendered in a webpage by a distinguished device other than the mobile device, the visual information encoding a value, the webpage having been received by the distinguished device in response to an HTTP request sent by the device specifying a distinguished URL;
- decoding the value from the captured image of the visual information; and
- using the decoded value to cause the documents selected by the user to be shared with the distinguished device that is different from the mobile device.

* * * * *